United States Patent
Hellweg et al.

(10) Patent No.: US 12,315,199 B2
(45) Date of Patent: May 27, 2025

(54) METHOD FOR CALIBRATING AN OPTICAL RECORDING DEVICE

(71) Applicant: Eppendorf SE, Hamburg (DE)

(72) Inventors: Wolf Lukas Hellweg, Hamburg (DE); Alexander Petermann, Hamburg (DE)

(73) Assignee: Eppendorf SE, Hamburg (DE)

( * ) Notice: Subject to any disclaimer, the term of this patent is extended or adjusted under 35 U.S.C. 154(b) by 0 days.

(21) Appl. No.: 18/245,286

(22) PCT Filed: Sep. 13, 2021

(86) PCT No.: PCT/EP2021/075071
§ 371 (c)(1),
(2) Date: Mar. 14, 2023

(87) PCT Pub. No.: WO2022/053671
PCT Pub. Date: Mar. 17, 2022

(65) Prior Publication Data
US 2024/0296587 A1   Sep. 5, 2024

(30) Foreign Application Priority Data
Sep. 14, 2020   (EP) ..................................... 20196062

(51) Int. Cl.
*G06T 7/80*   (2017.01)
*H04N 23/61*   (2023.01)

(52) U.S. Cl.
CPC ............... *G06T 7/80* (2017.01); *H04N 23/61* (2023.01)

(58) Field of Classification Search
CPC .................................. G06T 7/80; H04N 23/61
See application file for complete search history.

(56) References Cited

U.S. PATENT DOCUMENTS

| | | | |
|---|---|---|---|
| 8,310,539 B2 | 11/2012 | Zhao | |
| 10,369,698 B1 | 8/2019 | Islam | |
| 10,510,162 B2 | 12/2019 | Doganis | |
| 11,080,880 B2* | 8/2021 | Liu | G06T 7/55 |
| 2011/0181733 A1* | 7/2011 | Ishii | G06T 7/80 |
| | | | 348/E17.002 |
| 2012/0242839 A1 | 9/2012 | Shen | |
| 2015/0170365 A1* | 6/2015 | Liu | G06T 7/80 |
| | | | 382/103 |

(Continued)

FOREIGN PATENT DOCUMENTS

GB   2314621 A   1/1998

*Primary Examiner* — Brian P Yenke
(74) *Attorney, Agent, or Firm* — SLEMAN & LUND LLP

(57) ABSTRACT

Method for calibrating an optical recording device, the method comprises constructing a plurality of scenes so that, for each location of the first set of calibration locations, a calibration indicium of the set of indicia is located in a respective scene of the plurality of scenes at said each location; acquiring a plurality of images, so that each scene of the plurality of scenes is displayed in a respective image of the plurality of images; locating a plurality of calibration loci so that, for each location of the first set of calibration locations, a respective locus of the plurality of calibration loci is comprised in a respective image of the plurality of images; and calibrating the optical recording device by using the loci of the plurality of calibration loci as locations in the image plane of the projection onto the image plane of the first calibration view.

19 Claims, 12 Drawing Sheets

(56) References Cited

U.S. PATENT DOCUMENTS

| | | | | |
|---|---|---|---|---|
| 2017/0372491 | A1* | 12/2017 | Doganis | H04N 17/002 |
| 2018/0367739 | A1* | 12/2018 | Messely | G06T 7/80 |
| 2019/0104295 | A1* | 4/2019 | Wendel | G01B 11/2504 |
| 2021/0203855 | A1* | 7/2021 | Mo | H04N 23/62 |
| 2021/0291376 | A1* | 9/2021 | Wang | G01B 21/042 |
| 2022/0180559 | A1* | 6/2022 | Visan | G06T 7/74 |
| 2022/0264072 | A1* | 8/2022 | Anderberg | G06T 7/85 |
| 2022/0366569 | A1* | 11/2022 | Gao | H04N 5/2625 |
| 2023/0027236 | A1* | 1/2023 | Borovsky | H04N 17/002 |
| 2023/0041560 | A1* | 2/2023 | Kalra | H04N 25/705 |
| 2023/0070281 | A1* | 3/2023 | Melrose | G06T 7/80 |
| 2023/0328372 | A1* | 10/2023 | Fu | H04N 23/61 |
| | | | | 348/349 |
| 2023/0358772 | A1* | 11/2023 | Petermann | G06T 7/80 |
| 2024/0230694 | A9* | 7/2024 | Nalam Venkat | G06T 7/60 |
| 2024/0303863 | A1* | 9/2024 | Petermann | G06T 7/80 |

\* cited by examiner

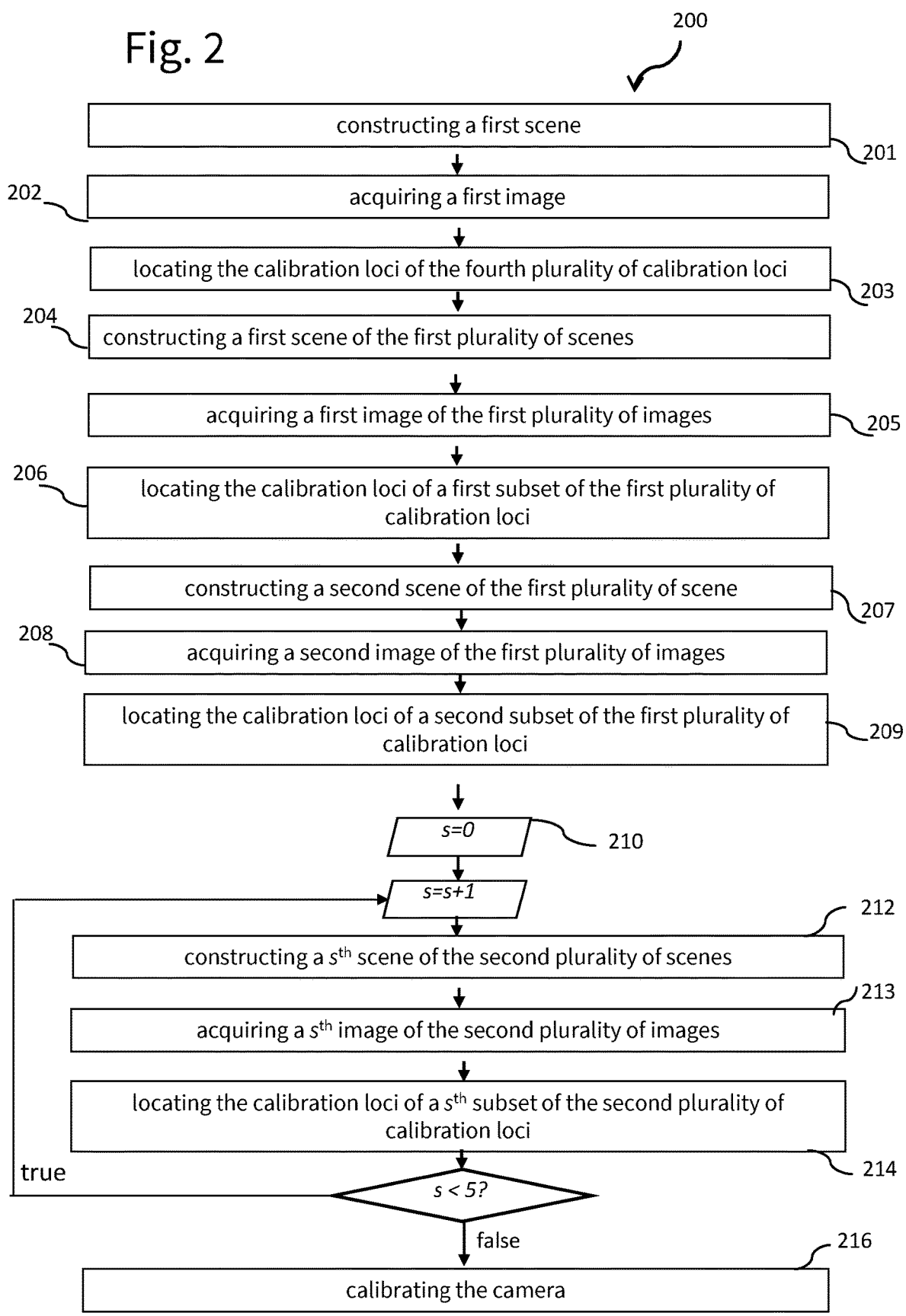

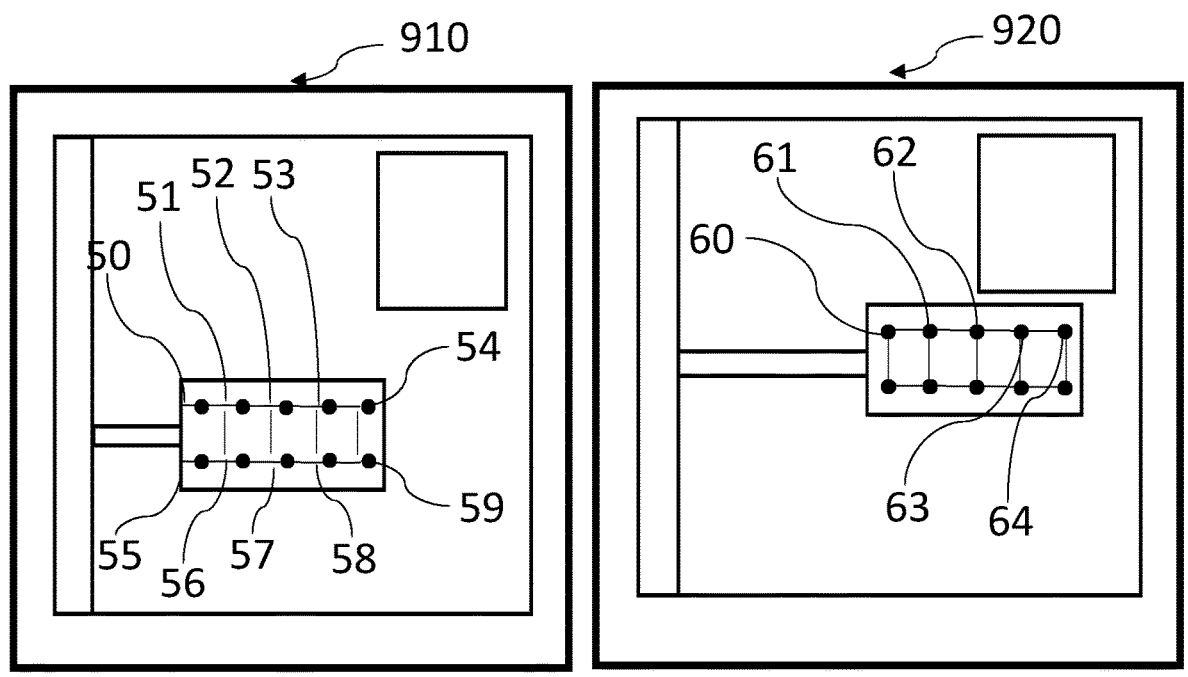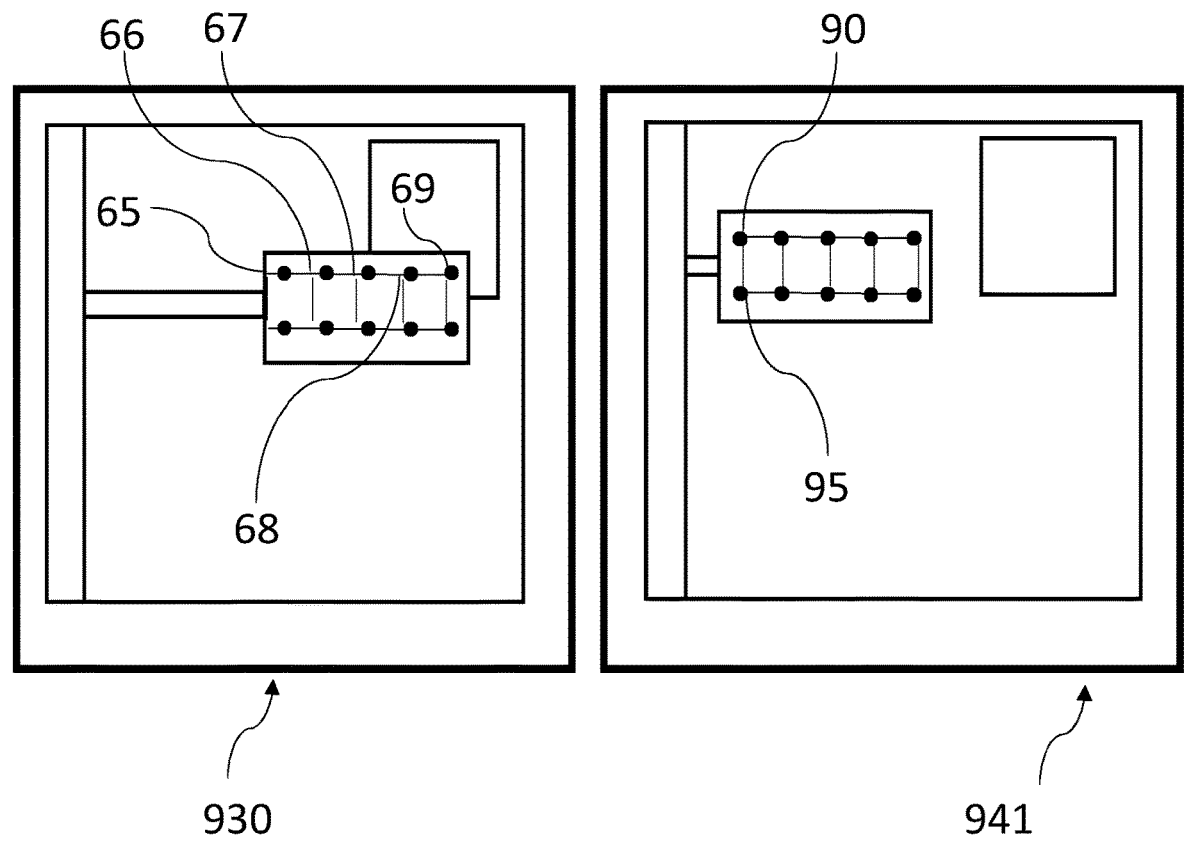
Fig. 8a

METHOD FOR CALIBRATING AN OPTICAL RECORDING DEVICE

FIELD

The present invention refers to a method for calibrating an optical recording device, in particular an optical recording device comprised in an automated laboratory system (ALS), e.g. in an automated pipetting system. The present invention refers also to an automated laboratory system configured to perform the method of the present invention. For instance, an optical recording device may be a video camera and/or a photo camera and is associated to a field of view and an image plane. In particular, the field of view of the device is the portion of the three-dimensional space that can be depicted by the optical recording device. In particular, the field of view depends on the position and/or on the orientation of the optical recording device in the three-dimensional space.

BACKGROUND

Methods for calibrating optical recording device aim to estimate the value of the intrinsic camera parameters of the device. For instance, intrinsic camera parameters are the focal length, the two-dimensional coordinate of the image centre with respect to the image coordinate system, the sensor scales, the diagonal distortion, and the parameters, that describe lens distortions.

The calibration methods known in the art estimate the value of the intrinsic camera parameters by using a model panel, e.g. a planar calibration pattern. Typically, the model panel comprises several calibration indicia arranged in a known pattern. For instance, the calibration indicia are the vertices of a two-dimensional chessboard or of a two-dimensional grid depicted on the model panel.

According to the known calibration methods, the value of the intrinsic camera parameters is estimated by using a plurality of calibration views. A calibration view comprises, e.g. consists of a set of calibration locations of the field of view. In particular, said calibration locations are locations of the field of view used to calibrate the camera. In general, the locations of a calibration view are arranged in a substantially planar region of the field of view.

The intrinsic camera parameters are estimated by using the coordinates of the locations of the calibration views and their projections in the image plane. Typically, the projections of the location of a calibration view are estimated from the positions, in which these locations are depicted in an image associated to the calibration view.

According to the known calibration methods, the image associated to a calibration view depicts the model panel in a location and with an orientation with respect to the optical recording device so that the locations of the calibration view associated to the image are marked by the calibration indicia of the model panel. In particular, each location of the calibration view associated to the image is marked by a respective calibration indicium of the model panel. Hence, each calibration view is associated with a single image in which each location of the calibration view is marked by an indicium of the model panel and, thus, different calibration views are associated with different images.

The methods known in the art require several calibration views that have to fulfil specific conditions. In particular, the locations of at least a calibration view shall be mappable to the locations of another calibration view by means of a three-dimensional roto-translation. Hence, in order for the optical recording device to be able to make an image in which the model panel marks the locations of the former calibration view and an image in which the model panel marks the locations of the latter calibration view, the model panel has to be rotatable and translatable.

This condition on the model panel increases the complexity of the calibration operations, in particular if the movement of the model panel is automated, as the model panel shall be provided with appropriate rotating means. In general, the automated motion of the model panel increases the calibration precision and, in some applications, is mandatory. For example, in many ALS, the optical recording device is located and oriented with respect to the work deck in such a way that the space between the device and the work deck does not allow a manual movement of the model panel due to the reduced dimensions of the space between the work deck and the optical recording device.

Moreover, typically, calibration methods require calibration views with a relatively large number of calibration locations. Hence, the model panel is dimensioned to accommodate a relatively large number of calibration indicia, which puts constraints on the minimum size that the model panel may have. In many applications, the relatively large size of the model panel may increase the complexity of the calibration operations, in particular if the model panel has to be moved within a relatively small space, e.g. within the space between the optical recording device and the work deck of an ALS.

SUMMARY

There is thus the need for detection methods that require only translatory movement of the model panel and may be carried out by using model panels of relatively small size. At least some of these problems are solved, at least in part, by the invention of the present application, which relates to a computer-implemented methods, to a data processing system, to a computer program product and to a computer-readable storage medium. Embodiments of the invention are subject matter of the dependent claims.

In a first aspect, the present invention refers to a computer implemented method for calibrating an optical recording device by using at least a model panel and a first calibration view. The optical recording device is associated with a field of view and an image plane and the model panel comprises a set of calibration indicia. The first calibration view comprises a first set of calibration locations of the field of view.

The method according to the first aspect of the present invention comprises the steps of:
constructing at least a first plurality of scenes so that, for each location of the first set of calibration locations, a calibration indicium of the set of indicia is located at a respective scene of the first plurality of scenes at said each location, and wherein each scene of the first plurality of scenes is constructed by translating the model panel to a respective position with respect to the optical recording device; and
acquiring at least a first plurality of images, so that each scene of the first plurality of scenes is displayed in a respective image of the first plurality of images. In particular, said respective image of the first plurality of images is associated with said each scene a of the first plurality of scenes.

The method of the first aspect of the present invention further comprises the step of:
locating at least a first plurality of calibration loci so that, for each location of the first set of calibration locations, a respective locus of the first plurality of calibration loci is comprised in a respective image of the first plurality of images, said respective image displaying a respective calibration indicium and said respective calibration indicium being located at said each location and being displayed in said respective locus. In particular, said location of the first set of calibration locations is associated with said respective locus of the first plurality of calibration loci.

Moreover, the method of the first aspect of the present invention further comprises the step of:

calibrating the optical recording device by using at least the loci of the first plurality of calibration loci as locations in the image plane of the projection onto the image plane of the first calibration view.

In particular, the step of calibrating the optical recording device is carried out by using each locus of the first plurality of calibration loci as location in the image plane of the projection onto the image plane of the respective location of the first set of locations associated with said each calibration locus.

The optical recording device may comprise or consist of a photo camera and/or a video camera. For instance, the optical recording device may comprise or consist of a digital camera and/or an analog camera. In particular, optical recording device may comprise or consist of a polychrome camera, a monochrome camera, a greyscale camera, a black-white camera, an UV camera, an IR camera, a video camera, and/or a three-dimensional RGBD camera.

For instance, the optical recording device may be a smart device e.g. comprise recording means for capturing images, a processing element (CPU, GPU, and the like). The optical recording device may comprise storage means comprising a volatile primary memory (e.g. a RAM, a DRAM, a SRAM, a CPU cache memory, and the like), a non-volatile primary memory (e.g. a ROM, a PROM, an EPROM and the like), and/or a secondary memory. In particular, the optical recording device may be the computing device that carries out the method of the present invention.

The optical recording device may be located at a fixed location of the three-dimensional world and/or at a location, which is fixed with respect to an object comprised in the field of view. For instance, if the field of view comprises a work deck of an automated laboratory system, the optical recording device may be located at a location, which is fixed with respect to the work deck.

For instance, in the pinhole camera model, the image plane is the plane, where the three-dimensional world is projected through the aperture of the camera. For example, if the optical recording device is an analog camera, the image plane is the photosensitive surface of the film, onto which the light passing through the open shutter impinges. If the optical recording device is a digital camera, the image plane may be the sensor plane. In particular, the image plane may be a curved surface, e.g. to take into account the geometry of the lenses of the optical recording device.

A location in the image plane may be expressed in terms of two coordinates in a reference frame, $F_1$, defined in the image plane. In the following, these coordinates are also called image plane coordinates.

In particular, the field of view of the device is the portion of the three-dimensional space that can be depicted by the optical recording device. In particular, the field of view depends on the position and/or on the orientation of the optical recording device in the three-dimensional space.

A calibration view is in particular a set of locations of the field of view, at least some of these locations being used to calibrate the optical recording device. A calibration view may be associated with a roto-translation and/or a homography transformation. Said roto-translation and/or a homography transformation can be used to define the position of the locations of the calibration view in the field of view with respect to a reference frame, $F_{fix}$ of the three-dimensional world, said reference frame being fixed with respect to the optical recording device. In particular, the roto-translation and/or the homography transformation may be parametrised by a set of parameters, which may be used to carry out the step of calibrating the optical recording device by using at least the loci of the first plurality of calibration loci.

The first calibration view may consist of the locations of the first set of locations. For example, the first calibration view is defined by the locations of the first set of calibration locations. In particular, the locations of the first set of calibration locations are arranged on a first region of the field of view. For instance, the first region may be substantially planar. In particular, the first set of calibration locations comprises N locations, $P_{(1),1}, P_{(1),2}, P_{(1),3}, \ldots, P_{(1),N}$.

A location of the first set of locations may be expressed in terms of three coordinates in a first reference frame, $F_1$, defined in the three-dimensional world, e.g. in the field of view. If the locations of the first set of calibration locations are arranged in the first planar region, the first reference frame $F_1$ may be defined in such a way that its (X, Y) plane lies on the first planar region, i.e. the Z coordinate of each location of the first set of calibration locations vanishes. In particular, the roto-translation and/or a homography transformation associated with the first calibration view is the transformation that maps the coordinates of the first reference frame into the coordinates of the reference frame $F_{fix}$.

In particular, a scene comprises the objects that are located within the field view of the optical recording device. A scene may be defined by the objects that are located within the field view of the optical recording device and by the position of said objects in the field of view. Two different scenes that comprise the same objects may differ from the locations of said objects in the field of view. For example, each scene of the first plurality of scenes differs from the other scenes of the first plurality of scenes in the position of the model panel with respect to the optical recording device.

For instance, each scene of the first plurality of scenes comprises the model panel which is positioned and oriented in the field of view in such a way that at least an indicium of the set of indicia is located at a location of the first set of calibration locations. In particular, in each scene of the first plurality of scenes, the model panel is arranged in such a way that at least a location of the first set of calibration locations is marked by an indicium of the set of indicia.

For instance, at least a scene of the first plurality of scenes comprises the model panel which is positioned and oriented in the field of view in such a way that each indicium of a subset of the set of calibration indicia is located at a respective location of the first set of calibration locations. For example, in at least a scene of the first plurality of scenes, the model panel is arranged in such a way that at least a fifth location and a sixth location of the first set of calibration locations are marked by a first indicium and a second indicium, respectively. Hence, in particular, the number of scenes of the first plurality of scenes may be smaller than or equal to the number of locations of the first set of calibration locations.

According to the present invention, in particular, for each location of the first set of calibration locations, a calibration indicium of the set of indicia is located in a respective scene of the first plurality of scenes. Throughout the present specification, said respective scene will be referred to also as the scene associated with said each location. A scene of the first plurality of scenes may be associated with a plurality of locations of the first set of locations.

According to the present invention an image, e.g. at least an image of the first plurality of images, may be a vector image or a two-dimensional grid of pixels, e.g. a rectangular grid of pixels. In particular, the location of a pixel in an image may be univocally determined in terms of its two-dimensional image coordinate in the image, said coordinates representing the location of said pixel in the two-dimensional grid of pixels.

An image, e.g. at least an image of the first plurality of images, may be encoded by at least a bitmap. A bitmap encoding an image or a portion thereof may comprise, e.g. consist of, an array of bits that specifies intensity, e.g. the color, of each pixel of said image or a portion thereof. The bitmap may be palette-indexed so that the entries of the array are indexes onto a color table. The entries of the array may store the bits encoding the color of the pixel. A bitmap may comprise, e.g. consist of, a dot matrix data structure representing the two-dimensional grid of pixels. The bitmap may further comprise information concerning the number of bits per pixel, the number of pixels per row of the two-dimensional grid and/or the number of pixels per column of said grid. An image viewer may use the information encoded in the bitmap to render the image on the screen of a computing device.

The step of acquiring the images of the first plurality of image may be carried out by capturing said images by using the optical recording device. This step may further comprise storing the images of the first plurality of images in a primary or secondary memory e.g. of a computing device and/or of the optical recording device. In particular, an image captured by the optical recording device, i.e. at least an image of the first plurality of images, may be a cap of a video. For instance, an image captured by the optical recording device, i.e. at least an image of the first plurality of images, may be a frame of a video.

The location of at least a calibration locus of the first plurality of calibration loci may be expressed in terms its image plane coordinates. In particular, the location of each calibration locus of the first plurality of calibration loci is expressed in terms its image plane coordinates.

For instance, the first plurality of calibration loci may comprise, e.g. consist of, N elements, $M_{(1),1}$, $M_{(1),2}$, ..., $M_{(1),N}$. For each $j \in \{1, 2, ..., N\}$ the calibration locus $M_{(1),j}$, may be described by the image coordinates $\underline{m}_{(1),j} = (\overline{u}_{(1),j}, \overline{v}_{(1),j})^T$. In particular, for each $j \in \{1, 2, ..., N\}$, the location $P_{(1),j}$ is associated with the calibration locus $M_{(1),j}$.

The step of calibrating the optical recording device may be carried out by using a calibration algorithm that uses as inputs at least the locations of the first set of calibration locations and the loci of the first plurality of calibration loci. In particular, said calibration algorithm uses each locus of the first plurality of calibration loci as the observed locus, at which the location associated with said each locus is displayed in the image plane. For example, the step of calibrating the optical recording device is carried out by using the Zhang's calibration algorithm and/or the Tsai's calibration algorithm.

In one embodiment of the present invention, the step of locating the first plurality of calibration loci is started only after completion of the step of constructing the first plurality of scenes and/or after completion of the step of acquiring the first plurality of images. Alternatively, the step of locating the loci of the first plurality of calibration loci may be carried out in a plurality of sub-steps and at least one of these sub-steps may be carried out before completion of the step of constructing the scenes of the first plurality of scenes and/or before completion of the step of acquiring the images of the first plurality of images. According to the present invention the step of constructing the first plurality of scenes and/or the step of acquiring the first plurality of images may be carried out in a plurality of sub-steps.

According to the present invention, a set comprises at least an element and, in particular, may consist of a single element. Alternatively, a set may comprise a plurality of elements. For example, the set of indicia may consist of an indicium or comprise a plurality of indicia. The first set of calibration locations may comprise at least a location and/or a plurality of locations. In particular, first set of calibration locations may comprise at least four locations.

The present invention estimates the coordinates of the loci in which the locations of the first calibration views are depicted in the image plane by using the first plurality of images. Each image depicts at least an indicium of the model panel located on a calibration location of the first set of calibration locations and is constructed by translating the model panel. According to the present invention, the calibration locations of the first set of calibration locations do not need to be marked in the same picture and, hence, the size of the model panel is not dictated by the number of locations of the first set of calibration locations. Thus, the optical recording device may be calibrated by using a relatively small model panel, in particular a model panel so small that it can accommodate a single calibration indicium.

Moreover, the method of the present invention allows for calibrating the optical recording device without the need to rotate the model panel, as it is shown below for an exemplary embodiment.

In an embodiment of the method of the present invention, the optical recording device is calibrated by using also a second calibration view, the second calibration view comprising a second set of calibration locations of the field of view. In particular, each location of the second set of calibration locations is mappable to a respective location of the first set of calibration locations by using a first roto-translation.

The second calibration view may consist of the locations of the second set of locations. For example, the second calibration view is defined by the locations of the second set of locations. In particular, the locations of the second set of calibration locations are arranged on a second region of the field of view. For instance, the second region may be substantially planar. The second set of calibration locations may comprise at least a location and/or a plurality of locations. In particular, second set of calibration locations may comprise at least four locations. In particular, the second set of calibration locations comprises N locations, $P_{(2),1}$, $P_{(2),2}$, ..., $P_{(2),N}$.

A location of the second set of locations may be expressed in terms of three coordinates in a second reference frame, $F_2$, defined in the three-dimensional world, e.g. in the field of view. For example, the second reference frame may be the first reference frame. If the locations of the second set of calibration locations are arranged in the first planar region, the second reference frame $F_2$ may be defined in such a way that its (X, Y) plane lies on the second planar region, i.e. the Z coordinate of each location of the second set of calibration locations vanishes. In particular, the roto-translation and/or a homography transformation associated with the second calibration view is the transformation that maps the coordinates of the second reference frame into the coordinates of the reference frame $F_{fix}$.

A roto-translation is a proper rigid transformation of the three-dimensional world, that comprises a rotation and/or a translation. In particular, a roto-translation is a proper rigid transformation that comprises a rotation and, optionally, a translation. For example, a roto-translation that transforms a first plane into a second plane, the latter plane being non-parallel to the former plane, shall comprise a rotation.

In a reference frame, F, of the three-dimensional world, the first roto-translation may be expressed in terms of a 3×3 orthogonal rotation matrix, $R_F$, and a three-dimensional translation vector, $\vec{t}_F$. For instance, for each $j \in \{1, 2, \ldots, N\}$ the location, $P_{(2),j}$ is mapped into the location, $P_{(1),j}$ of the first set of calibration locations. In particular, for each $j \in \{1, 2, \ldots, N\}$, the coordinates $\vec{p}_{(1),F,j}$, of the location $P_{(1),j}$ in the reference frame F are given by $\vec{p}_{(1),F,j} = R_F \vec{p}_{(2),F,j} + \vec{t}_F$, wherein $\vec{p}_{(2),F,j}$ are the coordinates, in the reference frame F, of the location, $P_{(2),j}$.

As mentioned above, the method of the present invention allows for calibrating the optical recording device without the need to rotate the model panel. As shown below, this is the case even if, for example, the model panel is positioned in a third position and oriented in a third orientation in the field of view in such a way, that the indicia of the model panel mark all the locations of the second set of calibration locations. In particular, an indicium of the model panel is located at and, thus, marks the location $P_{(2),1}$, which, in the reference frame F, is described by the coordinates $\vec{p}_{(2),F,1}$.

For example, in this case, the scene associated with the location $P_{(1),1}$ is constructed by translating the model panel from the third position to a position associated with the location $P_{(1),1}$ by means of a translation. In the reference frame F, said translation is described by the three-dimensional translation vector $\vec{d}_{F,1} = R_F \vec{p}_{(2),F,1} - \vec{p}_{(2),F,1} + \vec{t}_F$.

The scene associated with the location $P_{(1),2}$ is constructed by translating the model panel from the position associated with the location $P_{(1),1}$ to a position associated with the location $P_{(1),2}$ by means of a translation. In the reference frame F, said translation is described by the three-dimensional translation vector $\vec{d}_{F,2} = \vec{p}_{(1),F,2} - \vec{p}_{(1),F,1}$.

The scene associated to the positions $P_{(1),3}, P_{(1),4}, \ldots, P_{(1),N}$ are constructed in a similar way, by translating the model panel by using appropriate translations. In particular, the scene associated with the $j^{th}$ location $P_{(1),j}$ ($j \geq 2$) is constructed by translating the model panel from the position associated with the location $P_{(1),j-1}$ to a position associated with the location $P_{(1),j}$ by means of a translation. In the reference frame F, said translation is described by the three-dimensional translation vector $\vec{d}_{F,j} = \vec{p}_{(1),F,j} - \vec{p}_{(1),F,j-1}$.

An embodiment of the present invention, further comprises the steps of:
constructing at least a second plurality of scenes so that, for each location of a third set of calibration locations, a calibration indicium of the set of indicia is located at a respective scene of the second plurality of scenes at said each location, and wherein each scene of the second plurality of scenes is constructed by translating the model panel to a respective position with respect to the optical recording device; and
acquiring at least a second plurality of images, so that each scene of the second plurality of scenes is displayed in a respective image of the second plurality of images.

In particular, the third set of calibration locations comprises at least the locations of the second set of calibration locations that are not comprised in the first set of calibration locations. For instance, the third set of calibration locations is equal to the second set of calibration locations, e.g. the third set of calibration locations consists of the locations comprised in the second set of calibration locations.

This embodiment may further comprise the steps of:
locating at least a second plurality of calibration loci so that, for each location of the third set of calibration locations, a respective locus of the second plurality of calibration loci is comprised in a respective image of the second plurality of images, said respective image displaying a respective calibration indicium and said respective calibration indicium being located at said each location and being displayed in said respective locus.

Moreover, in this embodiment, the step of calibrating the optical recording device may be carried out by using the loci of a third plurality of calibration loci as locations in the image plane of the projection onto the image plane of the second calibration view.

In particular, the third plurality of calibration loci comprises the calibration loci of the second plurality of calibration loci and the calibration loci of the first plurality of calibration loci, that fulfils each condition of a set of conditions. The third plurality of calibration loci may consist of the calibration loci of the second plurality of calibration loci e.g. if none of the calibration loci of the first plurality of calibration loci fulfills each condition of the set of conditions.

For instance, the set of conditions comprises, e.g. consists of, the condition that the calibration locus is associated with a location of the field of view that is comprised in the first set of calibration locations and in the second set of calibration locations. For example, for each locus of the third plurality of calibration loci, said each locus is comprised in the second plurality of calibration loci and/or said each locus is associated with a location comprised in both the first set of calibration locations and the second set of calibration locations.

An embodiment of the method of the present invention further comprises the step of:
mapping each location of the second set of calibration locations onto a respective location of the field of view by using the first roto-translation, thereby constructing the first set of calibration locations.

In a further embodiment of the method of the present invention, the locations of the first set of locations are arranged on a first planar region of the field of view and the locations of the second set of locations are arranged on a second planar region of the field of view. In particular, the first planar region and the second planar region form an angle with one another. For instance, the first planar region and the second planar region are substantially perpendicular to one another. In particular, the first and the second planar region are not parallel to one another.

In this case, the method allows for calibrating the optical recording device by using two views which are not parallel to one another without the need to rotate the model panel.

In particular, the locations of the first set of locations and the locations of the second set of locations are arranged on a third planar region of the field of view.

According to an embodiment of the present invention, the locations of the first set of calibration locations are arranged with respect to one another so that each location of the first set of calibration locations is located at a respective node of a first grid graph. In particular, the first grid graph is a two-dimensional grid graph, more particularly, a rectangular and/or square grid. According to the present invention, a grid graph is in particular a lattice graph defined by a first lattice constant and a second lattice constant.

This arrangement of the locations of the first set of calibration locations allows for reducing the number of scenes of the first plurality of scenes. In particular, several locations of the first set of locations may be marked in the same scene. For instance, this may be achieved by using a model panel, in which the indicia are arranged at the nodes of a grid graph that corresponds, e.g. is substantially equal to, the first grid graph. For example, the first lattice constant and the second lattice constant of the latter grid graph are respectively equal to the first lattice constant and the second lattice constant of the first grid graph.

According to an embodiment of the invention, the locations of the second set of calibration locations are arranged with respect to one another so that each location of the second set of calibration locations is located at a respective node of a second grid graph. In particular, the second grid graph is a two-dimensional grid graph, more particularly, a rectangular and/or square grid. For instance, the first lattice constant and the second lattice constant of the second grid graph are respectively equal to the first lattice constant and the second lattice constant of the first grid graph. For example, the second grid graph is mappable to the first grid graph by using the first roto translation. In one embodiment the first lattice constant and/or the second lattice constant of the second grid graph may be different from the first lattice constant and/or from the second lattice constant of the first grid graph.

In an embodiment of the present invention, the first set of calibration locations comprises at least a first location and a second location, the first location and the second location being aligned on a first line at a first distance with respect to one another, and the set of calibration indicia comprises at least a first indicium and a second indicium, the first indicium and the second indicium being aligned on a second line at a second distance with respect to one another.

In particular, the first distance and the second distance are substantially equal to one another and the first line and the second line are substantially parallel to one another.

In this embodiment, the step of constructing the first plurality of scenes comprises constructing a first scene by translating the model panel to a first position with respect to the optical recording device so that, in the first position, the first indicium and the second indicium are located at the first location and at the second location, respectively.

In particular, the first set of calibration locations comprises at least a first plurality of calibration locations, which are aligned on the first line, and the of calibration indicia comprises at least a first plurality of indicia, which are aligned on the second line. For instance, in the first position, each indicium of the first plurality of indicia is located at a respective location of the first plurality of calibration locations.

In this embodiment, the first location and the second location are marked in the same scene and, hence, depicted in the same image. Hence, in this case, the number of scenes of the first plurality of scenes and, thus, the number of images in the first plurality of images are reduced and the calibration process is simplified.

In an embodiment of the present invention, the first set of calibration locations comprises at least a third location and a fourth location. The third location and the fourth location are aligned on a third line, the third line being substantially parallel to the first line. According to this embodiment, the first location and the third location are aligned on a fourth line, and the second location and the fourth location are aligned on a fifth line, the fourth line and the fifth line being substantially parallel to one another.

The step of constructing the first plurality of scenes may comprise constructing a second scene by translating the model panel from the first position to a second position with respect to the optical recording device so that, in the second position, the first indicium and the second indicium are located at the third location and at the fourth location, respectively. In particular, the first set of calibration locations may comprise a second plurality of calibration locations, which are aligned on the third line and the of calibration indicia comprises a second plurality of indicia, which are aligned on the second line. In particular, in the second position, each indicium of the second plurality of indicia is located at a respective location of the second plurality of calibration locations. For instance, the second plurality of indicia may comprise or be comprised in the first plurality of indicia. The second plurality of indicia may consist of the first plurality of indicia.

In this embodiment, the number of scenes of the first plurality of scenes and, thus, the number of images in the first plurality of images are further reduced. In particular, in this case, the third location and the fourth location are marked in the same scene and, hence, depicted in the same image.

In an embodiment of the present invention, the translation vector, $\vec{d}_F$, is substantially parallel to the fifth and the fourth line. Hence, the movement of the model panel between the first and the second position is minimized. This way, the calibration process is streamlined and the energy consumption to carry out this process is reduced. For example, in the reference frame F, the translation vector $\vec{d}_F$, is given by $\vec{d}_F = \vec{p}_{(1),F,3} - \vec{p}_{(1),F,1}$.

In an embodiment of the present invention, the set of calibration indicia consists of a third indicium and, optionally, the third indicium is a dot or a polygon, in particular a square.

In this case, the size of the model panel may be reduced, as this panel comprises a single indicium.

According to an embodiment of the present invention, the calibration indicia of the set of calibration indicia are arranged with respect to one another on the model panel so that each calibration indicia of the set of calibration indicia is located at a respective node of a third grid graph. In particular, the third grid graph is a two-dimensional grid graph, more particularly, a rectangular and/or square grid. For example, the first lattice constant and the second lattice constant of the third grid graph are respectively equal to the first lattice constant and the second lattice constant of the first grid graph.

According to the present invention, the model panel may comprise a plurality of squares forming a square grid or a chessboard pattern. If present, the square grid or chessboard patter may comprise a set of vertices of the plurality of squares, wherein each calibration indicium of the set of calibration indicia is or is located at a respective vertex of the set of vertices.

In an embodiment of the present invention, the step of locating the first plurality of calibration loci comprises locating at least a locus of the first plurality of calibration loci by using an image recognition algorithm. In particular, each locus of the first plurality of calibration loci is located by using the image recognition algorithm.

An algorithm is in particular a collection, e.g. a sequence, of instructions for processing input information to obtain output information. The instructions of an algorithm may be implemented in a computer and executed by a processor e.g. of the data processing system according to the present invention. In particular, the input information of the algorithm is encoded in input data that may be accessed by the processor carrying out the algorithm. In particular, the processor processes the input data according to the instructions of the algorithm to generate output information, which, typically, is encoded in output data. According to the present invention, in particular, an algorithm processes data when the algorithm comprises instructions, which, when executed by a processor, cause said processor to process these data.

For instance, the image recognition algorithm processes input data which comprise the position and the intensity value of each pixel of an input image or of a portion thereof. In particular, the image recognition algorithm comprises instructions that, when executed by a processor, cause said processor to process the input data to attempt to detect in the input image one or more indicia of the set of indicia.

The image recognition algorithm may be an algorithm that attempt to detect one or more indicia of the set of indicia in an input video taken by the optical recording device. For example, the image recognition algorithm comprises instructions that, when executed by a processor, cause said processor to process frames of the input video to attempt to detect in said frames one or more indicia of the set of indicia.

The output information may comprise information indicative of whether one or more indicia of the set of indicia are displayed in the input image. If this is the case, the output information may further comprise information indicative of the loci, at which the detected indicia are displayed in said image.

According to an embodiment of the method, the image recognition algorithm comprises at least a machine learning algorithm. In particular, a machine learning algorithm comprises instructions for processing input information to obtain output information and at least some of these instructions are set by using a set of training data and a training algorithm. The machine learning algorithm may comprise an Artificial Neural Network (ANN), a decision tree, a random forest, a support vector machine (SVM), or the like. For example, the first machine learning algorithm may be a convolutional neural network and/or a deep neural network.

In an embodiment of the present invention, the step of calibrating the optical recording device is carried out by using a set of parameters, wherein the set of parameters comprises parameters that parametrize a second roto-translation and/or a homography transformation. In particular, the second roto-translation and/or the homography transformation are associated with the first calibration view. For example, the second roto-translation and/or the homography transformation can be used define the position of the locations of the first set of calibration locations in the field of view with respect to a reference frame of the three-dimensional world. In particular, said reference frame is fixed with respect to the optical recording device.

The set of parameters may comprise, e.g. consist of, parameters suitable to uniquely determine the second roto-translation. In particular, the set of parameters consists of A elements that may be collected in an A-dimensional list, $\hat{a}_{(1)}$, given by:

$$\hat{a} = (a_{(1),1} \quad a_{(1),2} \quad \ldots \quad a_{(1),A}). \tag{1}$$

For example, the second roto-translation may be expressed in terms of a 3×3 orthogonal rotation matrix and a translation vector, $$R_{(1)} = \begin{pmatrix} r_{(1)1,1} & r_{(1)1,2} & r_{(1)1,3} \\ r_{(1)2,1} & r_{(1)2,2} & r_{(1)2,3} \\ r_{(1)3,1} & r_{(1)3,2} & r_{(1)3,3} \end{pmatrix}, \vec{t}_{(1)} = \begin{pmatrix} t_{(1)1} \\ t_{(1)2} \\ t_{(1)3} \end{pmatrix}. \tag{2}$$

In this case, the set of paraments may comprise the three entries of the translation vector $\vec{t}_{(1)}$ and three parameters parametrizing the entries of the rotation matrix $R_{(1)}$. For example, these three parameters may be the entries of the Rodrigues vector or the three Euler angles parametrizing the rotation matrix $R_{(1)}$.

In the reference frame F, the homography transformation may be expressed in terms of a 3×3 homography matrix, $H_{(1),3}$, and/or a 3×4 homography matrix, $H_{(1),4}$. In this case, the set of parameters may comprise the nine entries of $H_{(1),3}$, and/or the twelve entries of $H_{(1),4}$. The entries of these homography matrices may be parametrized in terms of the parameters that parametrize the second roto-translation, e.g. in terms of the entries of the matrix $R_{(1)}$ and of the vector $\vec{t}_{(1)}$. For example, $$H_{(1),3} = \lambda \begin{pmatrix} fs_x & fs_\theta & u_c \\ 0 & fs_y & v_c \\ 0 & 0 & 1 \end{pmatrix} \begin{pmatrix} r_{(1)1,1} & r_{(1)1,2} & t_{(1)1} \\ r_{(1)2,1} & r_{(1)2,2} & t_{(1)2} \\ r_{(1)3,1} & r_{(1)3,2} & t_{(1)3} \end{pmatrix}, \tag{3a}$$

and/or $$H_{(1),4} = \lambda \begin{pmatrix} fs_x & fs_\theta & u_c \\ 0 & fs_y & v_c \\ 0 & 0 & 1 \end{pmatrix} \begin{pmatrix} r_{(1)1,1} & r_{(1)1,2} & r_{(1)1,3} & t_{(1)1} \\ r_{(1)2,1} & r_{(1)2,2} & r_{(1)2,3} & t_{(1)2} \\ r_{(1)3,1} & r_{(1)3,2} & r_{(1)3,3} & t_{(1)3} \end{pmatrix}, \tag{3b}$$

wherein $\lambda$ is an overall scale factor, f is the focal length of the optical recording device, $(u_c \ v_c)^T$ is the location of the image center, and se the radial distortion. $s_x$ and $s_y$ are the second scale in the x and y direction, respectively. These calibration parameters of the camera may be collected in a six-dimensional list, c, given by:

$$\hat{c} = (f \quad s_x \quad s_y \quad s_\theta \quad u_c \quad v_c). \tag{4}$$

In an embodiment of the present invention, the step of calibrating the optical recording device is carried out by using a first set of parametrized loci, each parametrized locus of the first set of parametrized loci being a parametrization of the location of the projection onto the image plane of a respective location of the first set of calibration locations. Each parametrized locus of the first set of parametrized loci may depend on at least a parameter of the set of parameters.

In particular, the set of parametrized loci may comprise N elements, $Q_{(1),1}$, $Q_{(1),2}$, . . . . . , $Q_{(1),N}$. For each $j \in \{1, 2, \ldots, N\}$, the parametrized locus $Q_{(1),j}$ may be described by the image coordinates $q_{(1),j} = (u_{(1),j}, v_{(1),j})^T$.

For instance, for each $j \in \{1, 2, \ldots, N\}$, the image coordinate $q_{(1),j}$ may be a function of the calibration parameters and of the coordinates (X' Y' Z'):

$$q_{(1),j} = \frac{D(X', Y', Z')}{Z'} \begin{pmatrix} fs_x & fs_\theta \\ 0 & fs_y \end{pmatrix} \cdot \begin{pmatrix} X' \\ Y' \end{pmatrix} + \begin{pmatrix} u_c \\ v_c \end{pmatrix}, \quad (5)$$

The coefficient D(X', Y', Z') may be a function of the quantity r given by:

$$r = \sqrt{\left(\frac{X'}{Z'}\right)^2 + \left(\frac{Y'}{Z'}\right)^2}. \quad (6)$$

For example, the coefficient D(X', Y', Z') may be given by:

$$D(X', Y', Z') = 1 \quad (7a)$$

or $$D(X', Y', Z') = 1 + \sum_{c=1}^{K} k_c r^{2c}, \quad (7b)$$

In particular, K may be equal to two, to three, or to four. The coefficients $k_c$ are the distortion coefficients of the optical recording device. These coefficients may be collected in a K-dimensional list, $\hat{k}$, given by:

$$\hat{k} = (k_1 \quad k_2 \quad \ldots \quad k_K). \quad (8)$$

For example, D(X', Y', Z') may be given by eq. (7a) if the lens distortion is absent or negligible. In particular, the coordinates (X' Y' Z') may be expressed in terms of the coordinates $\vec{p}_{(1),F,j} = (X_{(1),F,j} \, Y_{(1),F,j} \, Z_{(1),F,j})^T$ of the location $P_{(1),j}$:

$$\begin{pmatrix} X' \\ Y' \\ Z' \end{pmatrix} = R_{(1)} \cdot \vec{p}_{(1),F,j} + \vec{t}_{(1)}, \quad (9)$$

As discussed above, the rotation matrix $R_{(1)}$ and the translation vector $\vec{t}_{(1)}$ may be parametrized by the parameters of the set of parameters, e.g. by the parameters comprised in the A-dimensional list $\hat{a}_{(1)}$. In particular, the rotation matrix $R_{(1)}$ and the translation vector $\vec{t}_{(1)}$ describe the roto-translation that maps the reference frame F into the camera reference frame, $F_C$. In particular, the reference frame $F_C$ is defined in the three-dimensional world and is such that: (i) its origin is located at the optical center of the optical recording device; (ii) its Z-axis aligns with the optical axis of the optical recording device; and (iii) its Z-axis is perpendicular to the image plane. In particular, in the frame $F_C$, the image plane intersects the Z-axis at the point (0 0 f)T.

For example, for each $j \in \{1, 2, \ldots, N\}$, the image coordinate $q_{(1),j}$ may be a function of the aforementioned homography matrices:

$$\begin{pmatrix} u_{(1),j} \\ v_{(1),j} \\ 1 \end{pmatrix} = H_{(1),4} \cdot \begin{pmatrix} X_{(1),F,j} \\ Y_{(1),F,j} \\ Z_{(1),F,j} \\ 1 \end{pmatrix} \quad (10)$$

and/or $$\begin{pmatrix} u_{(1),j} \\ v_{(1),j} \\ 1 \end{pmatrix} = H_{(1),3} \cdot \begin{pmatrix} X_{(1),F,j} \\ Y_{(1),F,j} \\ 1 \end{pmatrix}.$$

In particular, the latter equation holds in a reference frame, in which $Z_{(1),j}=0$. For example, if the reference frame F is chosen in such a way, that, for each $j \in \{1, 2, \ldots, N\}$, $Z_{(1),F,j}=0$, the numerical value of each of the entries of the matrix $H_{(1),3}$ may be estimated by using the coordinates $\vec{P}_{(1),F,1}, \vec{P}_{(1),F,2}, \ldots, \vec{P}_{(1),F,N}$, the image coordinates $\underline{m}_{(1),1}, \underline{m}_{(1),2}, \ldots, \underline{m}_{(1),N}$, and the direct linear transformation. In this case, the entries of the matrix $H_{(1),3}$ may be parametrized according to eq. (3a). Hence, in this case, the numerical values of the entries of the matrix $H_{(1),3}$ may be used to estimate the numerical value of each of the calibration parameters comprised in the list $\hat{c}$, the numerical value of each of the entries of the first two columns of the matrix $R_{(1)}$, and the numerical value of each of the entries of the vector $\vec{t}_{(1)}$.

For example, for each $j \in \{1, 2, \ldots, N\}$, the image coordinate $q_{(1),j}$ may be a function of the calibration parameters and of the coordinates (X' Y' Z'):

$$q_{(1),j} = \begin{pmatrix} f_x & 0 \\ 0 & f_y \end{pmatrix} \begin{pmatrix} X'' \\ Y'' \end{pmatrix} + \begin{pmatrix} u_c \\ v_c \end{pmatrix}, \quad (11)$$

wherein $f_x$ and $f_y$ are the focal lengths expressed in pixel units. The coordinates (X" Y" Z") may be expressed as follows:

$$\begin{cases} X'' = \frac{X'}{Z'} \frac{1 + \bar{k}_1 r^2 + \bar{k}_2 r^4 + \bar{k}_3 r^6}{1 + \bar{k}_4 r^2 + \bar{k}_5 r^4 + \bar{k}_6 r^6} + 2\bar{k}_7 \frac{X'}{Z'} \frac{Y'}{Z'} + \bar{k}_8 \left(r^2 + 2\left(\frac{X'}{Z'}\right)^2\right) \\ Y'' = \frac{Y'}{Z'} \frac{1 + \bar{k}_1 r^2 + \bar{k}_2 r^4 + \bar{k}_3 r^6}{1 + \bar{k}_4 r^2 + \bar{k}_5 r^4 + \bar{k}_6 r^6} + 2\bar{k}_8 \frac{X'}{Z'} \frac{Y'}{Z'} + \bar{k}_7 \left(r^2 + 2\left(\frac{Y'}{Z'}\right)^2\right) \end{cases} \quad (12)$$

in terms of the coordinates (X' Y' Z') defined in eq. (9) and of the quantity r defined in eq. (6). The coefficients $\bar{k}_1$ to $\bar{k}_6$ are radial distortion coefficients and the coefficients $\bar{k}_7$ and $\bar{k}_8$ are tangential distortion coefficients.

The use of the parametrized loci allows to determine the locations of the first set of calibration locations in terms of the (known) coordinates of indicia in the calibration panel and of the position and orientation of the first region of the field of view. The latter position and orientation are described by the second roto-translation and/or by the homography transformation, which are parametrized by the parameters of the set of parameters. These parameters may be estimated during the calibration step e.g. by using the Zhang's calibration algorithm and/or the Tsai's calibration algorithm, and do not need to be known a priori or measured before the calibration step, thereby streamlining the calibration procedure.

In particular, the step of calibrating the optical recording device comprises minimizing a parametric function with respect to the parameters of the set of parameters. The parametric function depends on the parameters of the set of parameters.

In particular, the parametric function depends on the loci of the plurality of calibration loci and on the parametrized loci of the set of parametrized loci. More particularly, the parametric function depends on the parameters of the set of parameters via its dependence on the parametrized loci of the set of parametrized loci.

In particular, the parametric function is minimized at least for the calibration parameters of the camera and/or for the parameters of the set of parameters. In particular, the parametric function is minimized at least for the parameters comprised in the list $\hat{a}_{(1)}$ and in the list $\hat{c}$ and, if present, for the ones comprised in the list $\hat{k}$. The minimization may be carried out by using iterative methods such as the Levenberg-Marquart method.

For example, the parametric function comprises the function $G_{(1)}$ given below:

$$G_{(1)} = \sum_{j=1}^{N} \left\| q_{(1),j} - m_{(1),j} \right\|_{[2]}^{2}, \qquad (13)$$

wherein $\|\underline{v}\|_{[2]}$ denotes the norm of the two-dimensional vector $\underline{v}$ and $q_{(1),j}$ may be computed by using eqs. (5) to (9) or eqs. (6), (9), (11) and (12). The function $G_{(1)}$ may depend on the calibration parameters comprised in the list $\hat{c}$, and, if present, on the ones of the list $\hat{k}$, as the coordinates $q_{(1),1}$, $q_{(1),2}, \ldots, q_{(1),N}$ may depend on these parameters, cf. eqs. (5) to (9). These coordinates and, hence, the function $G_{(1)}$ may also depend on the parameters of the set of parameters.

If the reference frame F is chosen so that, for each $j \in \{1, 2, \ldots, N\}$, $Z_{(1),F,j} = 0$, the parametric function may comprise the function $L_{(1)}$ given below:

$$L_{(1)} = \sum_{j=1}^{N} \left\| \begin{pmatrix} \bar{u}_{(1),j} \\ \bar{v}_{(1),j} \\ 1 \end{pmatrix} - H_{(1),3} \begin{pmatrix} X_{(1),F,j} \\ Y_{(1),F,j} \\ 1 \end{pmatrix} \right\|_{[3]}^{2}, \qquad (14)$$

wherein $\|\vec{v}\|_{[3]}$ denotes the norm of the three-dimensional vector $\vec{v}$. In this case, the parametric function may be minimized at least for the entries of the matrix $H_{(1),3}$. The minimization allows for estimating the numerical value of each of these entries. As explained above, these numerical values allow for estimating the numerical value of each of the calibration parameters comprised in the list $\hat{c}$, as well as the numerical value of each of the entries of the first two columns of $R_{(1)}$, and the numerical value of each of the entries of $\vec{t}_{(1)}$.

The minimization of the calibration function allows for increasing the number of calibration locations, thereby reducing the impact of the statistical errors affecting the calibration errors e.g. related to the uncertainty of the position of the model panel in the field of view and/or of the position of the loci in the images of the first plurality of images.

According to an embodiment of the method of the present invention, the optical recording device is calibrated by using also a third calibration view, the third calibration view comprising a fourth set of calibration locations of the field of view. In particular, each location of the fourth set of calibration locations is mappable to a respective location of the second set of calibration locations by using a third roto-translation.

In particular, the method of the present invention may further comprise the step of mapping each location of the fourth set of calibration locations onto a respective location of the field of view by using the third roto-translation, thereby constructing the second set of calibration locations.

In an embodiment of the present invention, the optical recording device is calibrated by using also a plurality of calibration views. In particular, each calibration view of the plurality of calibration views comprises a respective set of calibration locations of the field of view. In particular, each location of said respective set of calibration locations is mappable to a respective location of the first set of calibration locations by using a respective roto-translation. The plurality of calibration views may comprise at least four calibration views and, in particular, the second calibration view and/or the third calibration view.

The present invention refers to a data processing system comprising an optical recording device associated with a field of view and an image plane, translating means for translating a model panel in the field of view, and processing means configured to perform the method according to the present invention. In particular, the translating means are configured to translate the model plane at least in the field of view. The data processing system may further comprise the model panel.

The present invention refers also to an automated laboratory system comprising the data processing system of the present invention. In particular, the automated laboratory system of the present invention comprises an optical recording device associated with a field of view and an image plane and translating means for translating a model panel in the field of view. The automated laboratory system of the present invention further comprises processing means configured to perform the method according to the present invention and a work deck for positioning a labware item. The automated laboratory system of the present invention may further comprise the model panel.

A labware item may comprise or consist of a container for use in a clinical or laboratory environment. This container may be made of glass, plastic, metal, and the like. For example, a labware item may comprise or consists of a culture dish which may comprise, a top, a lid and/or bottom. In particular, a labware item comprises or consists of a sample vial and/or a test tube. A labware item may be for single use, for multiuse and/or disposable. For example, the labware item may comprise or consist of a plate, a tip, a tube, a reservoir, a tip box, a height adapter, a reservoir rack and/or a tube rack.

The present invention refers also to a computer program product comprising instructions which, when the program is executed by the data processing system according to the present invention, causes said system to carry out the method according the present invention.

The invention concerns a computer-readable storage medium comprising instructions which, when executed by a system according to the present invention, cause said system to carry out the method of the present invention.

According to the present invention, a computing device may comprise a processing element (CPU, GPU, and the like) and storage means. The storage means may comprise at least a volatile primary memory (e.g. a RAM, a DRAM, a SRAM, a CPU cache memory, and the like), a non-volatile primary memory (e.g. a ROM, a PROM, an EPROM and the like), and/or a secondary memory. In particular, the volatile primary memory temporarily holds program files for execution by the processing element and related data and the non-volatile primary memory may contain boot-strap code for the operating system of the computing device. According to the present invention, a computing device may be a computer system including input and/or output devices and, more particularly, may be a smartphone, a computer, a tablet, or the like. In particular, the first node, the second node, the third node and/or the fourth node of the computer network, may be a computing device or a cluster thereof.

BRIEF DESCRIPTION OF THE DRAWINGS

Exemplary embodiments of the invention are described in the following with respect to the attached figures. The figures and corresponding detailed description serve merely to provide a better understanding of the invention and do not constitute a limitation whatsoever of the scope of the invention as defined in the claims. In particular:

FIG. 2 is a flow diagram of the operation of a first embodiment of the method according to the present invention;

FIGS. 8a, 8b are schematic representations of images captured by carrying out the first embodiment of the method of the present invention.

DETAILED DESCRIPTION OF THE PREFERRED EMBODIMENTS

Figure 1A:
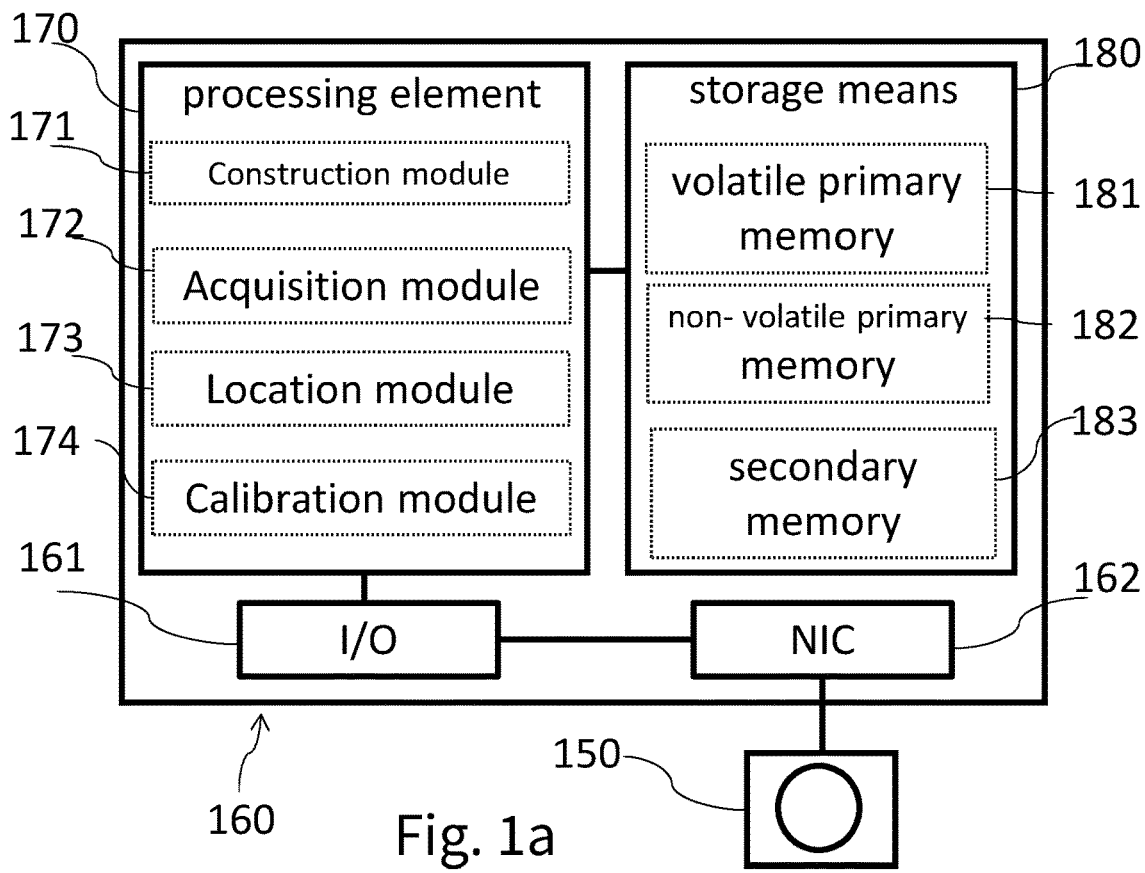
FIG. 1a is a schematic representation of the data processing system of a first embodiment of the automated laboratory system (ALS) according to the present invention.
Figure 1B:
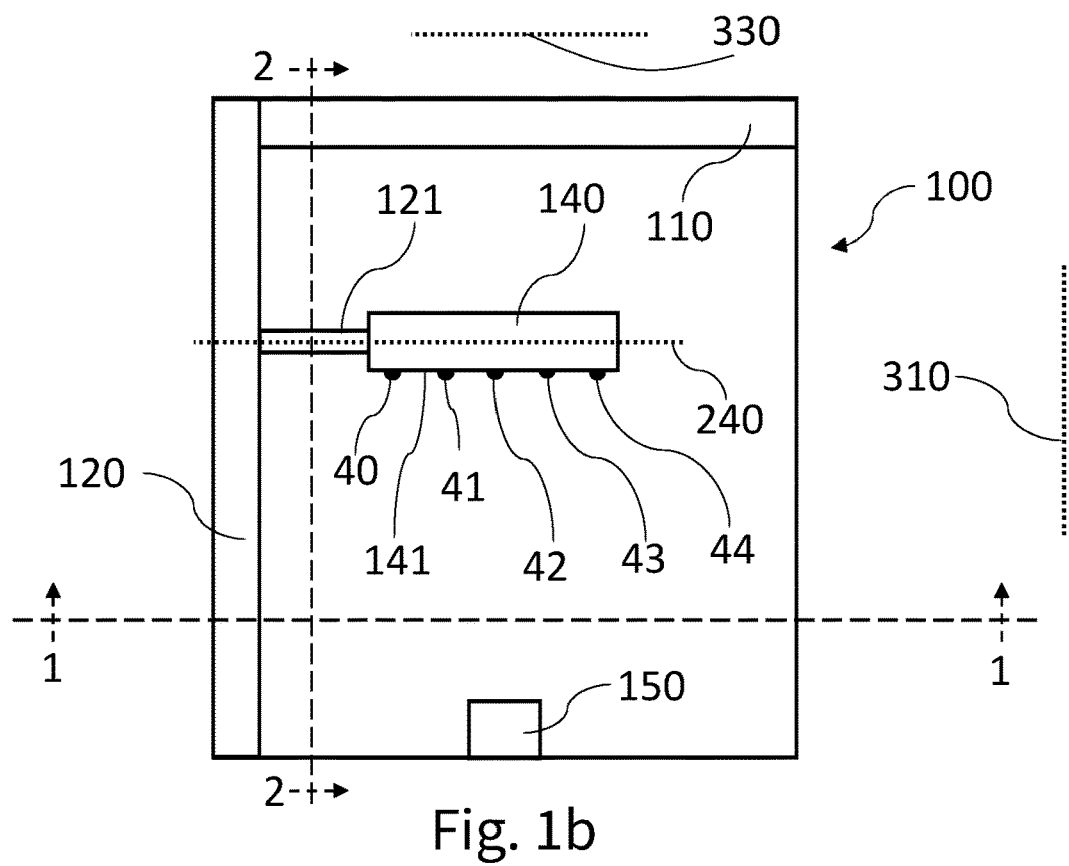
FIGS. 1b told are schematic representation of the first embodiment of the ALS according to the present invention.
Figure 1C:
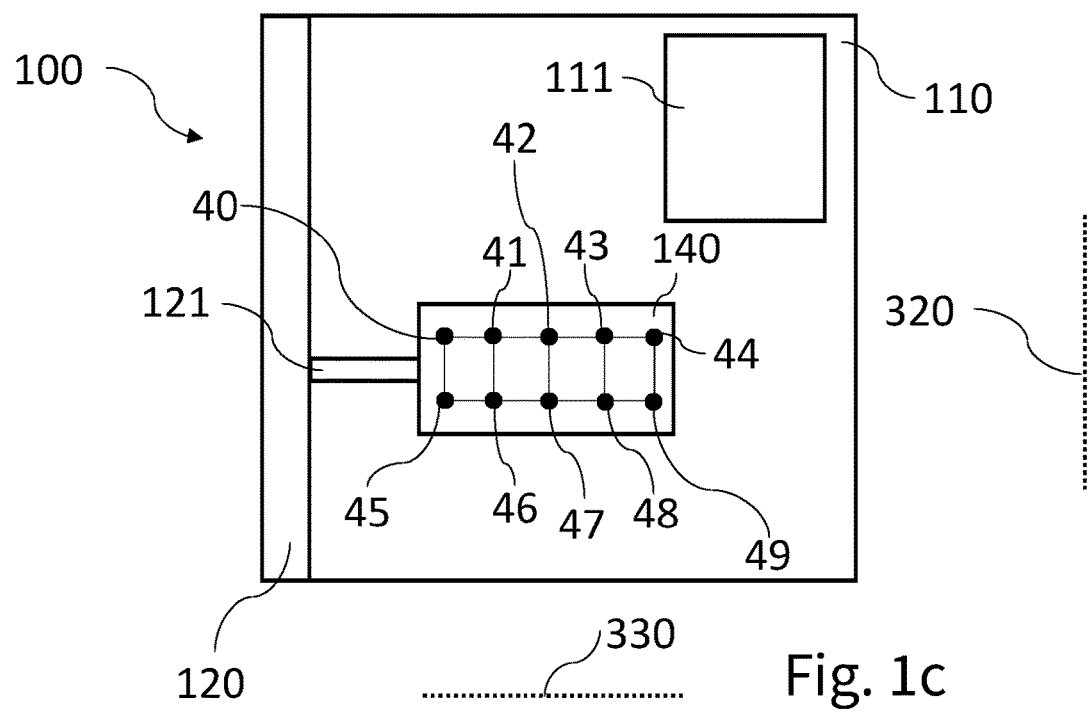
Figure 1D:
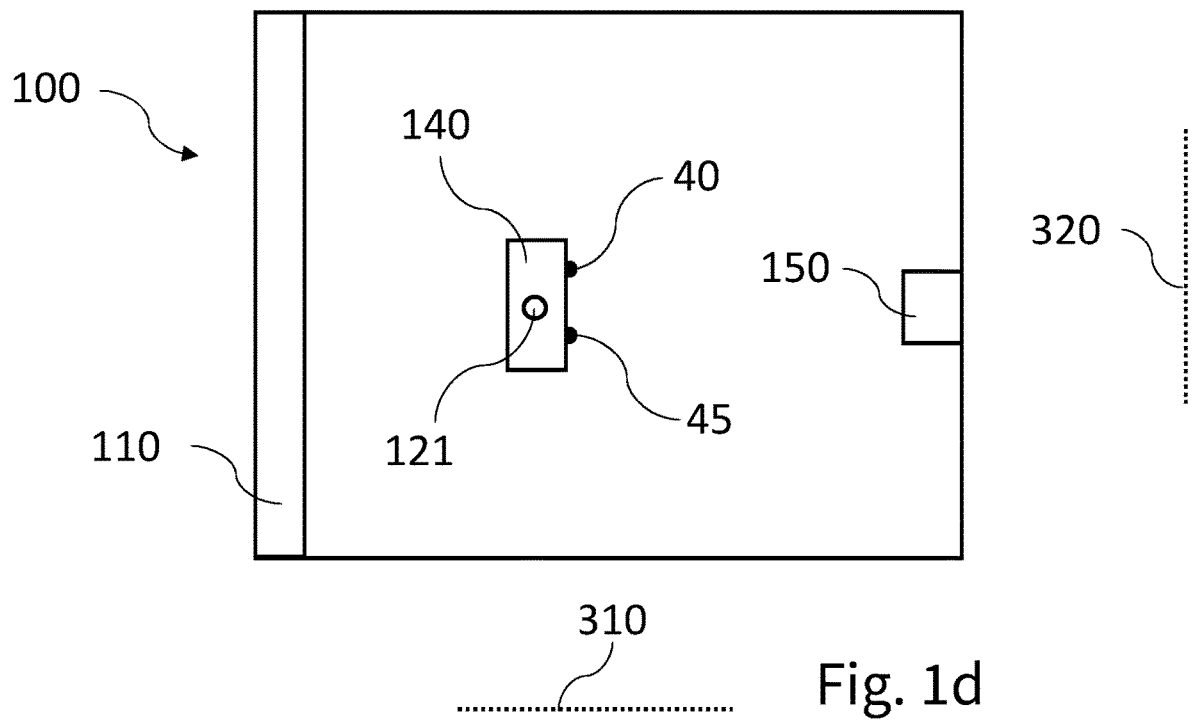

FIGS. 1b to 1d are schematic representations of the first embodiment of the ALS 100 according to the present invention. FIG. 1c and FIG. 1d are, respectively a sectional view along the line 1-1 and a sectional view along the line 2-2 of FIG. 1b.

The ALS 100 comprises an optical recording device in the form of a digital camera 150. The camera 150 is in particular configured to capture the images of the first plurality of images and may comprise or consist of a photo camera and/or a video camera. The ALS 100 further comprises a work deck 110 for positioning one or more labware items. As best shown in FIG. 1c, the work deck 110 comprises a waste container 111. The ALS 100 comprises a model panel 140 having, in this embodiment, a substantially parallelepipedal shape. As best shown in FIG. 1c, the model panel 140 comprises a set of calibration indicia 40-49 arranged on the face 141 of the model panel 140, that faces the optical recording device 150, see FIG. 1b. Each indicium of the set of indicia 40-49 is arranged at a respective node of a rectangular grid graph.

The model panel 140 is operatively connected to translating means 120 adapted to translate the model panel 140 at least within the field of view of the optical recording device 150. For example, the translating means 120 may comprise a first rail a second rail and a first motor (not shown) operatively connected with the second rail. The first rail and the second rail extend substantially parallel to a first direction 310 and a second direction 320, respectively. In particular, the second rail is movably connected to the first rail in such a way, that the second rail is translatable by the first motor along the first rail e.g. parallel to the first direction 310.

The translating means 120 comprises an extensible arm 121, e.g. a telescopic arm. Moreover, the translating means 120 may further a second motor and a third motor (not shown), which are operatively connected with the arm 121. The arm 121 extends parallel to a third direction 330, is connected with the model panel 140, and co-moves with said panel 140. The arm 121 is movably connected to the second rail in such a way, that the arm 121 is translatable by the second motor along the second rail. The arm 121 is extensible along an extension direction 240 by the third motor. As shown in FIG. 1b, the extension direction is substantially parallel to the third direction 330. The first motor, the second motor and/or the third motor may be a servo and/or a step motor.

The ALS 100 comprises a data processing system (DPS) 160, schematically depicted in FIG. 1a. The DPS 160 may comprise a computing device or a cluster thereof. For example, the DPS 160 may be a smartphone, a desktop computer, a tablet, a laptop or the like. The DPS 160 comprises a processing element 170 and storage means 180, which are in data communication with one another. The processing element 170 may consist of or comprise a CPU and/or a GPU and comprises several modules 171-174 configured to perform the steps of the method of the present invention.

The storage means 180 may comprise volatile primary memory 181 (e.g. a RAM, a DRAM, a SRAM, a CPU cache memory or the like) and/or non-volatile primary memory 182 (e.g. a ROM, a PROM, an EPROM or the like). In particular, the volatile primary memory may consist of a RAM. For instance, the volatile primary memory 181 temporarily holds program files for execution by the processing element and related data and the non-volatile primary memory 182 may contain bootstrap code for the operating system of the DPS 160.

The storage means 180 may further comprise a secondary memory 183, which may store the operating system and/or the instructions of the algorithms used to carry out the method of the present invention. Moreover, the secondary memory 183 may store a computer program product comprising instructions which, when the computer program product is executed by the DPS 160, cause the DPS 160 to carry out the method according to the present invention.

The secondary memory 183, the primary memories 181, 182, and the processing element 170 need not be physically housed within the same housing and may instead be spatially separated from one another. In particular, the secondary memory 183, the primary memories 181, 182, and the processing element 170 may be spatially separated from one another and may exchange data with one another via wired and/or wireless media (not shown).

The DPS 160 may comprise an input/output (I/O) interface 161 which allows the DPS 160 to communicate with input/output devices (e.g. displays, keyboards, touchscreens, printers, mice, cameras, or the like). The DPS 160 may further comprise a network interface controller (NIC) 162 configured to connect the DPS 160 with a suitable network (not shown). According to the present invention, a suitable network may for instance be an intranet, the internet or a cellular network.

The camera 150 may be connected to the processing element 110 via the I/O interface 161. For example, the camera 150 may be connected wirelessly to the I/O interface via the NIC 162. The camera 150 may be an intelligent device with its own memory for storing associated instructions and data for use with the I/O interface 161 or peripheral devices.

The processing element 170 comprises several modules 171 to 174 configured to carry out the method of the present invention. The construction module 171 is configured to construct scenes, e.g. the scenes of the first plurality of scenes. In particular, the construction module 171 is configured to control the translating movement of the model panel 140 thereby constructing scenes, e.g. the scenes of the first plurality of scenes. More particularly, the construction module 171 is configured to operate the first, the second and or the third motor to translate and/or extend the arm 121, thereby translating the model panel 140. The acquisition module 172 is configured to operate the camera 150 to acquire images, e.g. the images of the first plurality of images.

The location module 173 is configured to locate at least the first plurality of calibration loci. The calibration module 174 is configured to calibrate the optical recording device by using at least the loci of the first plurality of calibration loci as locations in the image plane of the projection onto the image plane of the first calibration view.

The ALS 100 may be an automatic pipetting system. In this case, the ALS 100 comprises a pipetting head (not shown) for liquid transfer. The pipetting head may be movable with respect to the work deck by means of a servo motor and/or stepper motor. In particular, the DPS 160 may comprise a module configured to operate the motor that moves the pipetting head.

FIG. 2 is a flow diagram 200 of the operation of a first embodiment of the method according to the present invention. In particular, this embodiment of the method may be carried out by the first embodiment of the ALS 100 described above and schematically depicted in FIGS. 1a to 1d.

Figure 3A:
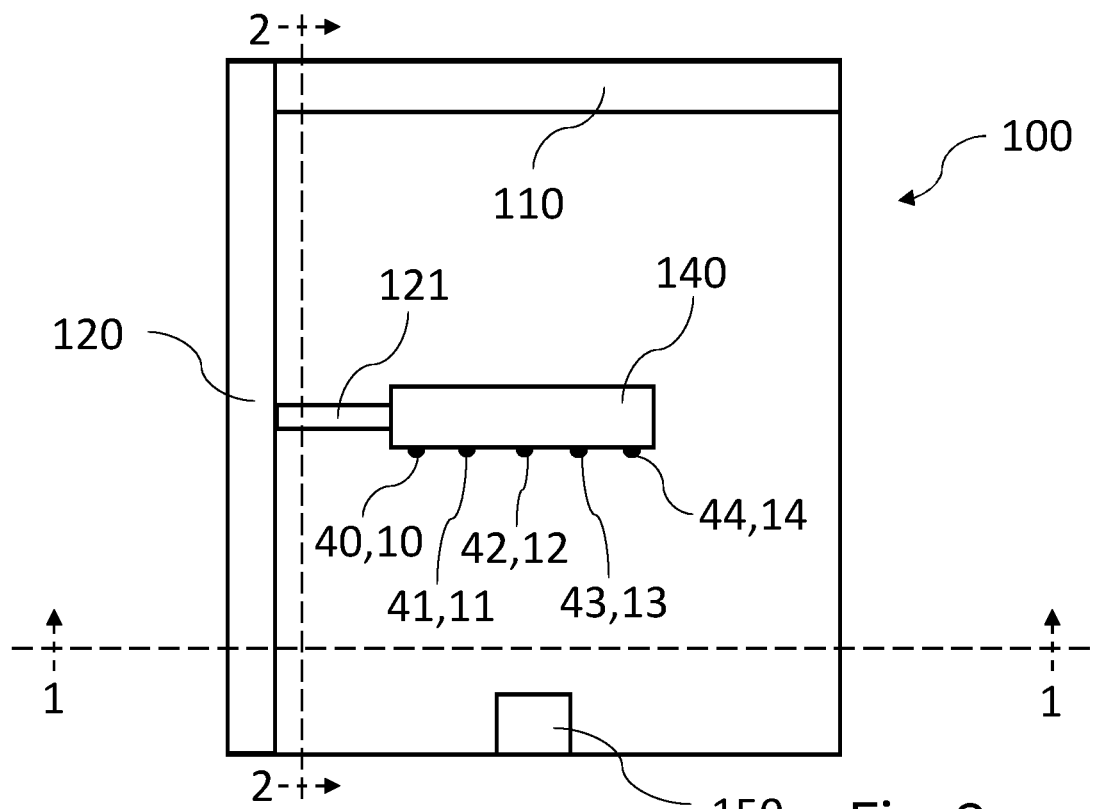
FIGS. 3a to 3c are schematic representations of the first embodiment of the ALS.
Figure 3B:
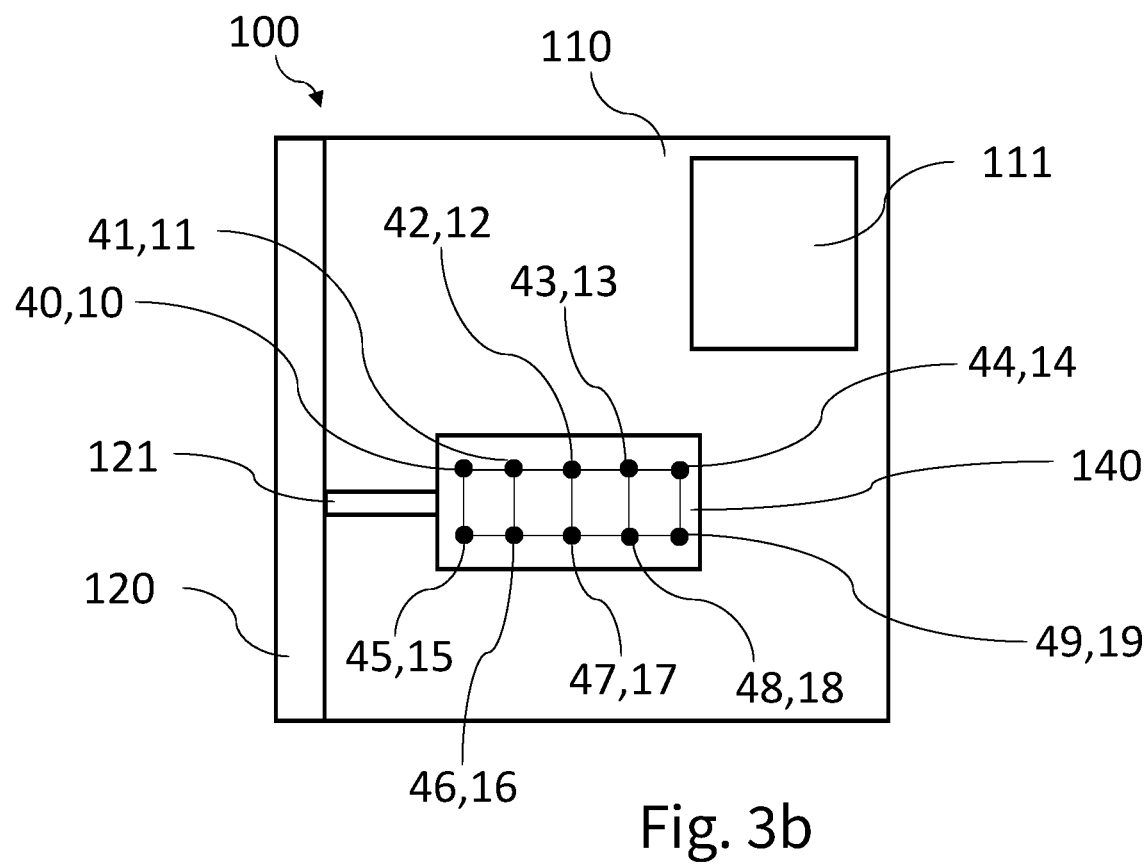
Figure 3C:
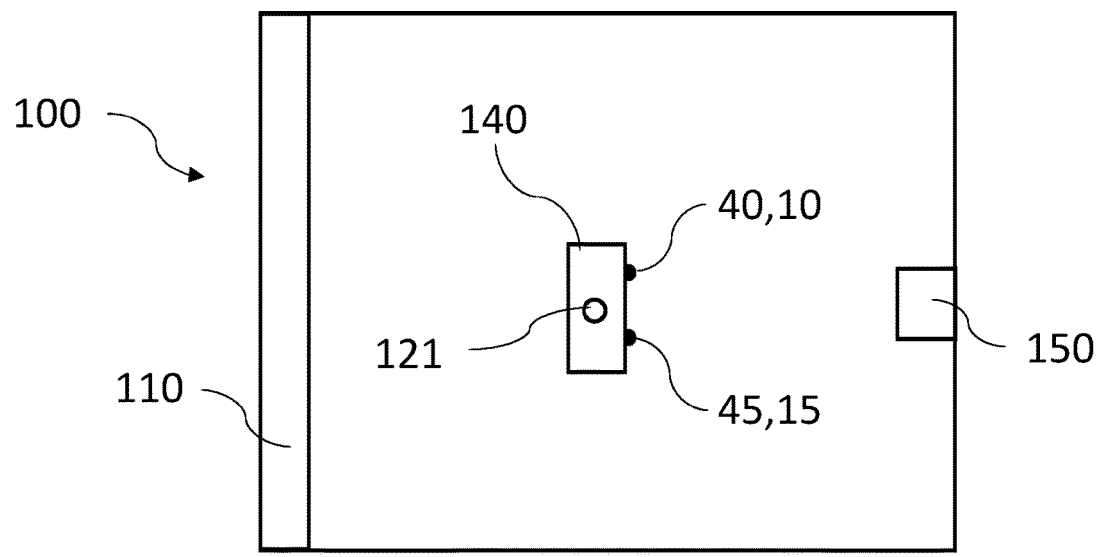

At step 201, the ALS 100 constructs a first scene, which is schematically depicted in FIGS. 3a to 3c. FIG. 3b and FIG. 3c are, respectively a sectional view along the line 1-1 and a sectional view along the line 2-2 of FIG. 3a. In particular, at step 201, the DPS 160 controls the translating means 120 to translate the model panel 140 to the first position with respect to the camera 150, thereby constructing the first scene.

Figure 6A:
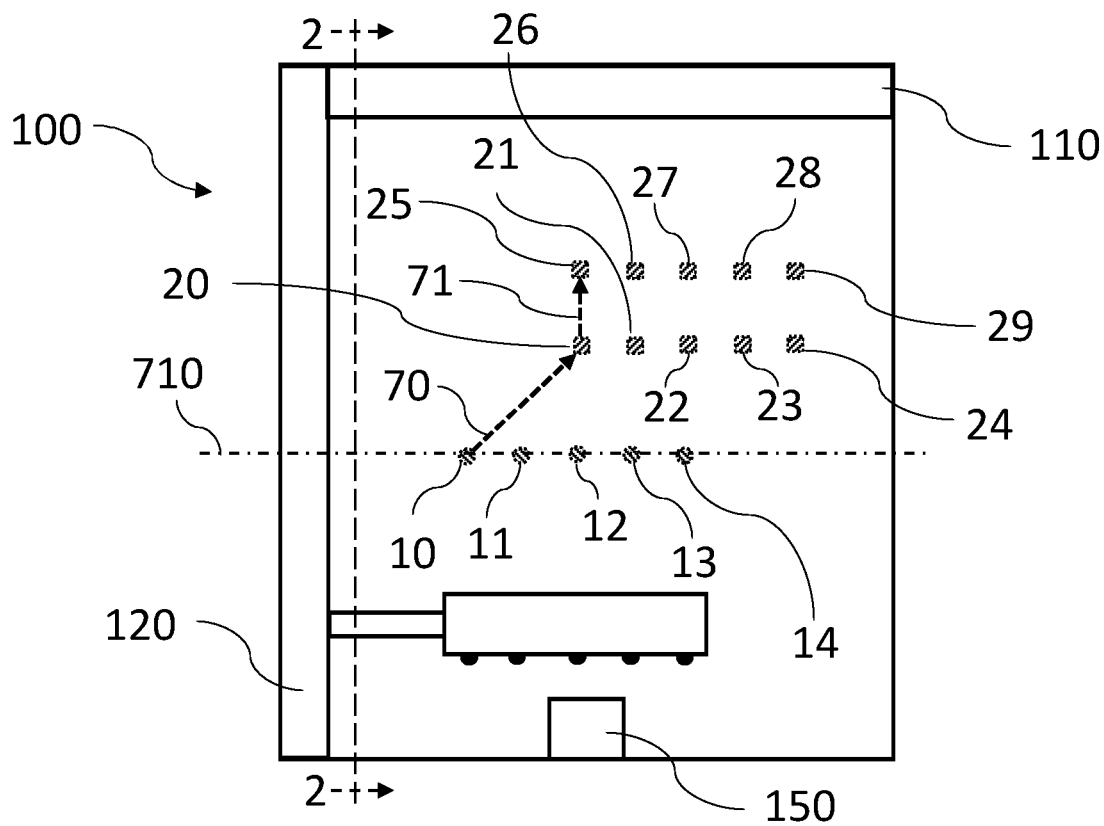
FIGS. 6a, 6b are schematic representations of the first embodiment of the ALS.
Figure 6B:
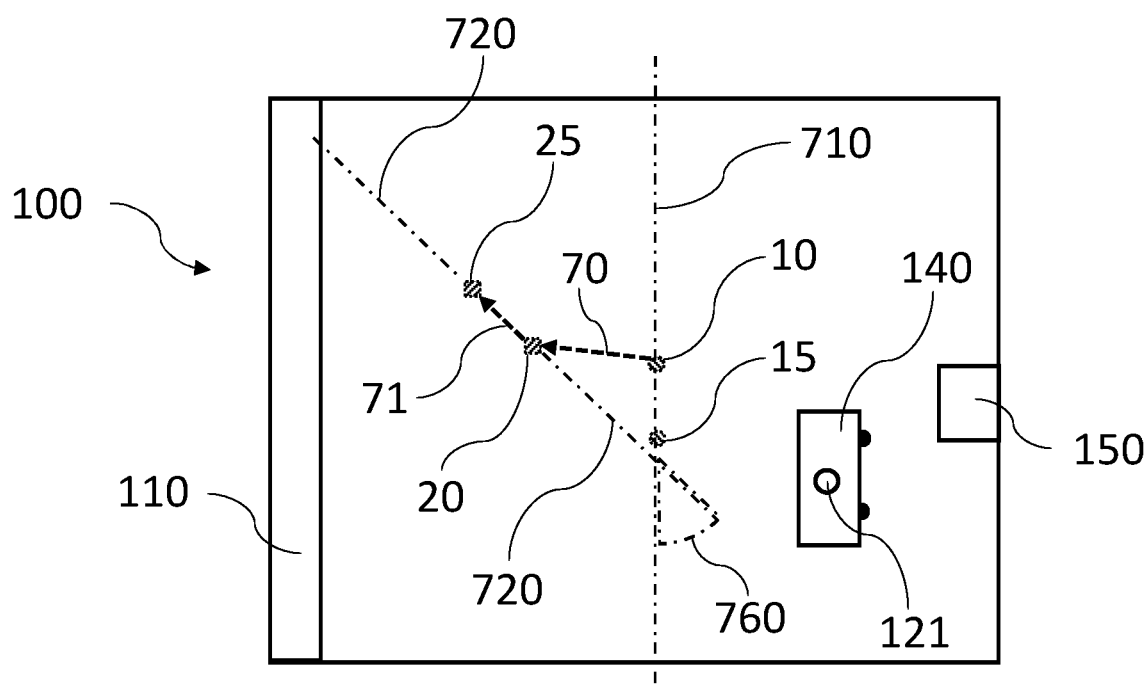

As best shown FIG. 3b, in the first scene, each calibration indicium of the set of indicia 40-49 is arranged at a respective location of the fourth set of calibration locations 10-19. In particular, in FIGS. 3a to 3c, the calibration indicium identified by the reference number $n$ is located at the location identified by the reference number $n-30$. In FIGS. 6a and 6b, the locations of the fourth set of calibration locations 10-19 are marked by shaded dots. In particular, FIG. 6b is a sectional view along the line 1-1 and a sectional view along the line 2-2 of FIG. 6a.

The locations of the fourth set of calibration locations 10-19 are comprised in and, in particular, define the third calibration view. In particular, in this embodiment, the third calibration view comprises ten locations $P_{(3),1}, P_{(3),2}, \ldots, P_{(3),10}$, wherein, for each $j \in \{1, 2, \ldots, 10\}$, the location $P_{(3),j}$ is identified in FIG. 3b by the reference number (j+9).

At step 202, the DPS 160 operates the camera 150 to acquire a first image 910, which is schematically represented in FIG. 8a.

At step 203, the ALS 100 locates the calibration loci of a fourth plurality of calibration loci 50-59, so that for each location of the first set of calibration locations 10-19, a respective locus of the fourth plurality of calibration loci 50-59 is comprised in the first image 910. In particular, for each $n \in \{10, 11, \ldots, 19\}$, the location identified in FIG. 3b by the reference number $n$ is associated with the respective locus, which, in FIG. 8a, is identified by the reference number $n+40$.

For each location of the first set of calibration locations 10-19, the first image 910 displays a respective calibration indicium, said respective calibration indicium being located at said each location and being displayed in the respective locus associated with said each location. In particular, for each $n \in \{10, 11, \ldots, 19\}$, the location identified in FIG. 3b by the reference number $n$ is associated with the respective calibration indicium, which, in FIG. 3b, is identified the reference number $n+30$.

The calibration loci of the fourth plurality of calibration loci 50-59 may be located in the first image 910 by using an image recognition algorithm, e.g. a machine learning image recognition algorithm.

In this embodiment, the third plurality of calibration loci 50-59 consists of ten calibration loci $M_{(3),1}, M_{(3),2}, \ldots, M_{(3),10}$, wherein, for each $j \in \{1, 2, \ldots, 10\}$, the calibration locus $M_{(3),j}$ is described by the image coordinates $\underline{m}_{(3),j}$ and is identified in FIG. 8a by the reference number $\overline{(j+49)}$.

Figure 4A:
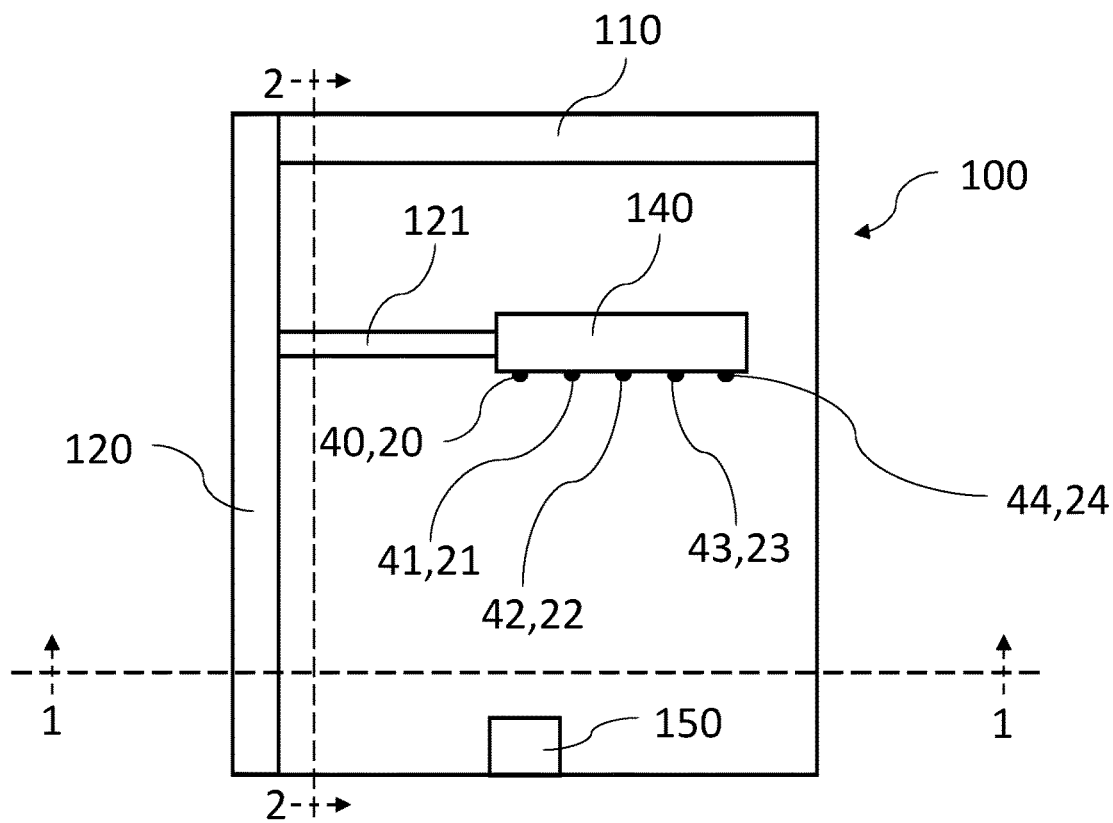
FIGS. 4a to 4c are schematic representations of the first embodiment of the ALS.
Figure 4B:
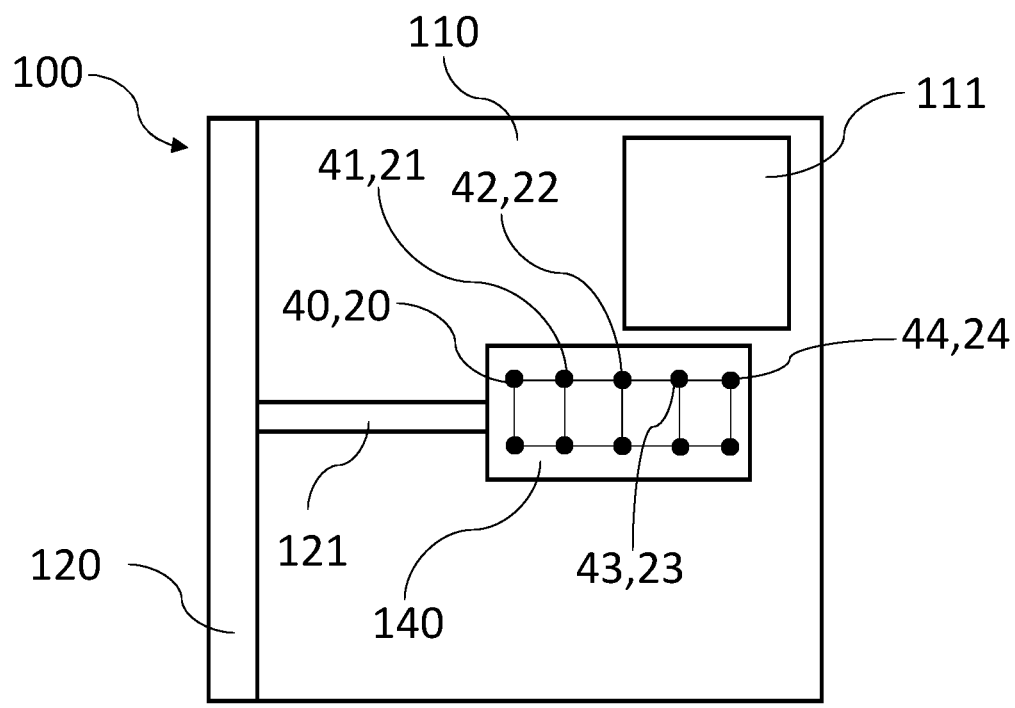
Figure 4C:
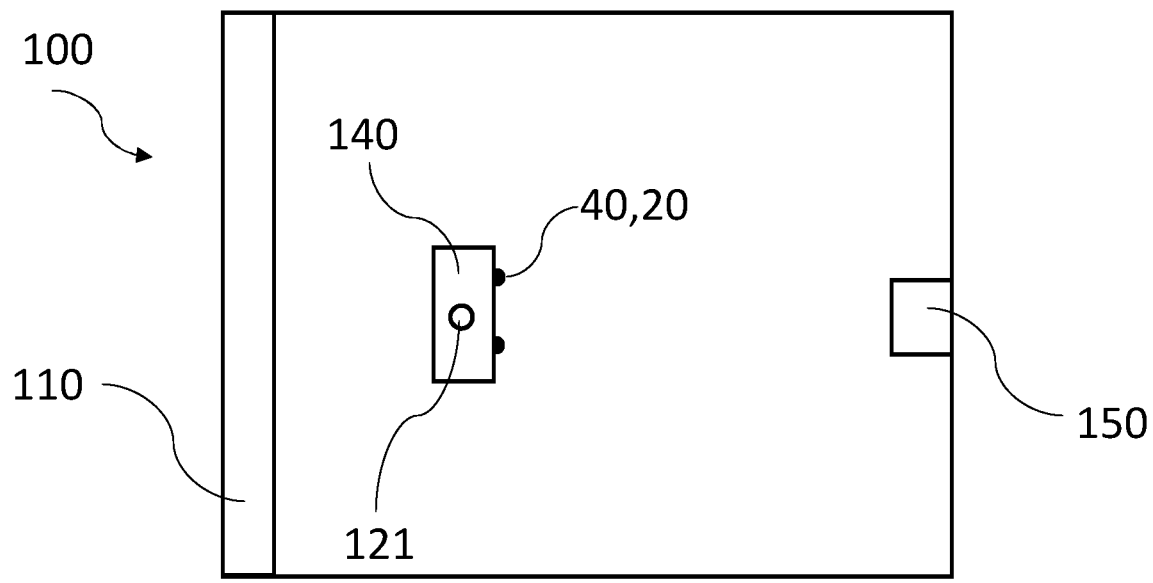

At step 204, the ALS 100 constructs a first scene of the first plurality of scenes, which is schematically depicted in FIGS. 4a to 4c. In particular, FIG. 4b and FIG. 4c are, respectively a sectional view along the line 1-1 and a sectional view along the line 2-2 of FIG. 4a. At step 204, the DPS 160 controls the translating means 120 to translate the model panel 140 from the first position with respect to the camera 150 to a second position with respect to the camera 150, thereby constructing the first scene of the first plurality of scenes.

As best shown FIGS. 4a and 4b, in the first scene of the first plurality of scene, each calibration indicium of a first subset 40-44 of the set of indicia 40-49 is arranged at a respective location of a first subset 20-24 of the first set of calibration locations 20-29. In particular, in FIGS. 4a to 4c, the calibration indicium identified by the reference number $n$ is located at the location identified by the reference number $n-20$. In FIGS. 6a and 6b, the locations of the first subset 20-24 of the first set of calibration locations 20-29 are marked by shaded squares. As best shown in the latter figures, in order to construct the first scene of the first plurality of scenes, the model panel 140 is translated by a translation vector 70 in such a way that, when the model panel 140 is translated from the first position to the second position, the calibration indicium 40 moves from the location 10 to the location 20.

At step 205, the DPS 160 operates the camera 150 to acquire a first image 920 of the first plurality of images 920, 930, cf. FIG. 8a.

At step 206, the ALS 100 locates the calibration loci of a first subset 60-64 of the first plurality of calibration loci 60-69, so that for each location of the first subset 20-24 of the first set of calibration locations 20-29, a respective locus of the first subset 60-64 of the first plurality of calibration loci 60-69 is comprised in the image 920. In particular, for each $n \in \{20, 21, \ldots, 24\}$, the location identified in FIG. 4b by the reference number n is associated with the respective locus, which, in FIG. 8a, is identified by the reference number $n+40$.

For each location of the first subset 20-24 of the first set of calibration locations 20-29, the image 920 displays a respective calibration indicium, said respective calibration indicium being located at said each location and being displayed in the respective locus associated with said each location. In particular, for each $n \in \{20, 21, \ldots, 24\}$, the location identified in FIG. 4b by the reference number $n$ is associated with the respective calibration indicium, which, in FIG. 4b, is identified by the reference number $n+20$.

The calibration loci of the first subset 60-64 of the first plurality of calibration loci 60-69 may be located in the first image 920 of the first plurality of images 920, 930 by using the image recognition algorithm.

Figure 5A:
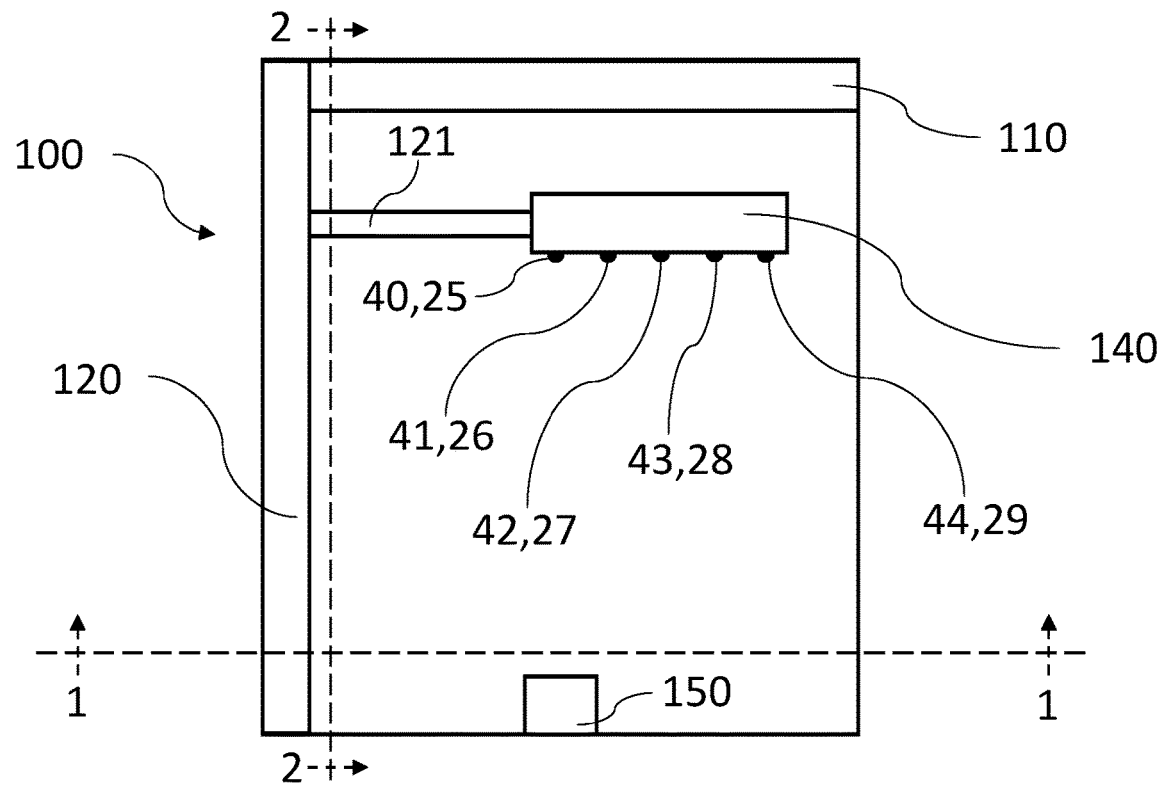
FIGS. 5a to 5c are schematic representations of the first embodiment of the ALS.
Figure 5B:
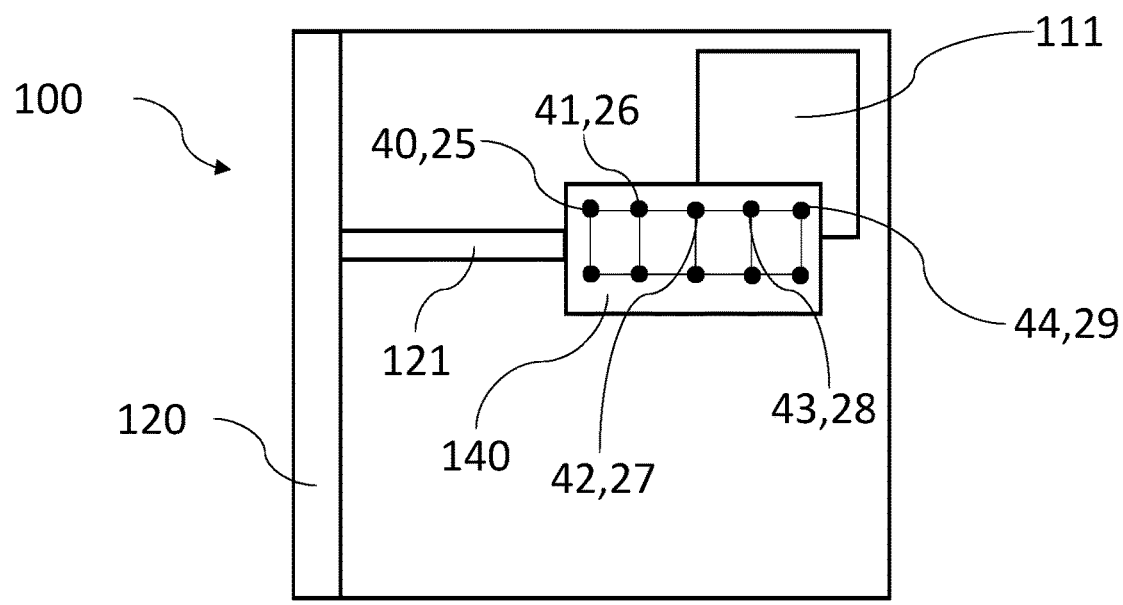
Figure 5C:
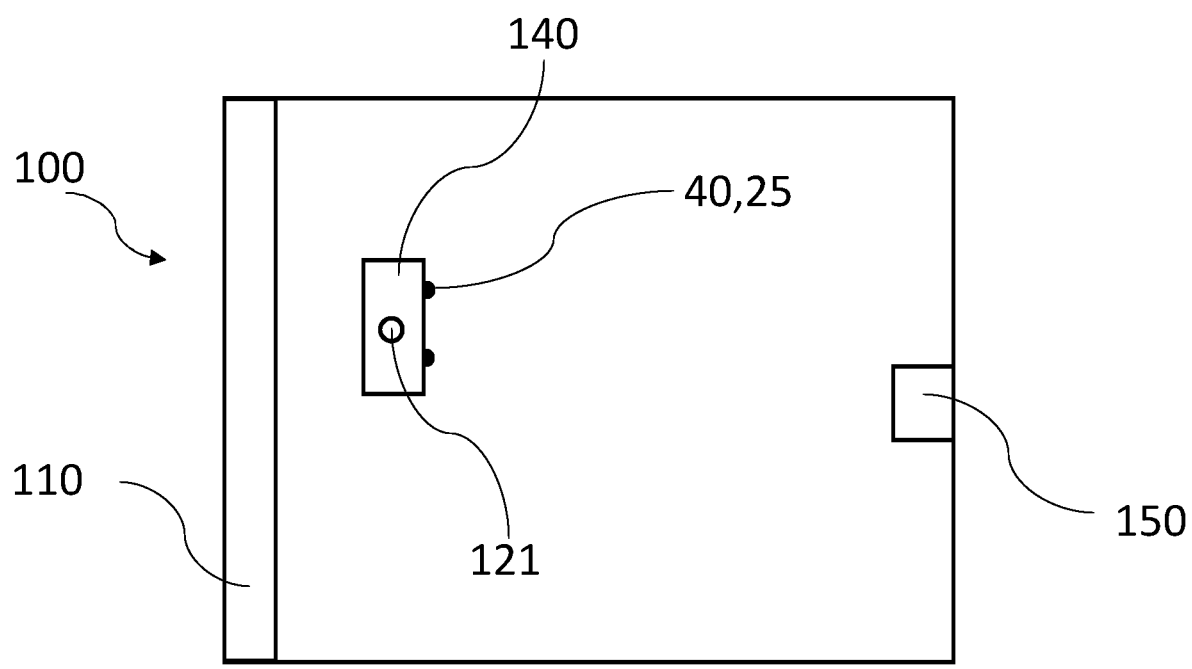

At step 207, the ALS 100 constructs a second scene of the first plurality of scenes, which is schematically depicted in FIGS. 5a to 5c. In particular, FIG. 5b and FIG. 5c are, respectively a sectional view along the line 1-1 and a sectional view along the line 2-2 of FIG. 5a. In particular, at step 207, the DPS 160 controls the translating means 120 to translate the model panel 140 from the second position with respect to the camera 150 to a third position with respect to the camera 150, thereby constructing the second scene of the first plurality of scenes.

As best shown FIGS. 5a and 5b, in the second scene of the first plurality of scene, each calibration indicium of the first subset 40-44 of the set of indicia 40-49 is arranged at a respective location of a second subset 25-29 of the first set of calibration locations 20-29. In particular, in FIGS. 5a to 5c, the calibration indicium identified by the reference number $n$ is located at the location identified by the reference number $n-15$.

In FIGS. 6a and 6b, the locations of the second subset 25-29 of the first set of calibration locations 20-29 are marked by shaded squares. As best shown in the latter figures, in order to construct the second scene of the first plurality of scenes, the model panel 140 is translated by a translation vector 71 in such a way that, when the model panel 140 is translated from the second position to the third position, the calibration indicium 40 moves from the location 20 to the location 25. The length of the vector 71 is equal to the distance between the indicium 40 and the indicium 45, so that the distance between the location 20 and the location 25 is equal to the distance between the location 10 and the location 15.

As best shown in FIGS. 6a and 6b, the locations of the first set of calibration locations 20-29 are arranged on the first planar region 720 the locations of the fourth set of locations 10-19 are arranged on a fourth planar region 710. The first planar region 720 and the fourth planar region 710 form an angle 760 with one another. The fourth planar region 710 is mappable onto the first planar region 720 by means of a roto-translation.

The locations of the first set of calibration locations 20-29 are comprised in and, in particular, define the first calibration view. In particular, in this embodiment, the first calibration view comprises ten locations $P_{(1),1}, P_{(1),2}, \ldots, P_{(1),10}$, wherein, for each $j \in \{1, 2, \ldots, 10\}$, the location $P_{(1),j}$ is identified in FIGS. 6a and 7a by the reference number (j+19).

At step 208, the DPS 160 operates the camera 150 to acquire a second image 930 of the first plurality of images 920, 930, cf. FIG. 8a.

At step 209, the ALS 100 locates the calibration loci of a second subset 65-69 of the first plurality of calibration loci 60-69, so that for each location of the second subset 25-29 of the first set of calibration locations 20-29, a respective locus of the second subset 65-69 of the first plurality of calibration loci 60-69 is comprised in the image 930. In particular, for each $n \in \{25, 26, \ldots, 29\}$, the location identified in FIG. 5b by the reference number n is associated with the respective locus, which, in FIG. 8a, is identified by the reference number $n+40$.

For each location of the second subset 25-29 of the first set of calibration locations 20-29, the image 930 displays a respective calibration indicium, said respective calibration indicium being located at said each location and being displayed in said respective locus. In particular, for each $n \in \{25, 26, \ldots, 29\}$, the location identified in FIG. 5b by the reference number n is associated with the respective calibration indicium, which, in FIG. 5b, is identified by the reference number $n+15$.

The calibration loci of the second subset 65-69 of the first plurality of calibration loci 60-69 may be located in the second image 930 of the first plurality of images 920, 930 by using the image recognition algorithm.

In this embodiment, the first plurality of calibration loci 60-69 consists of ten calibration loci $M_{(1),1}, M_{(1),2}, \ldots, M_{(1),10}$. For each $j \in \{1, 2, \ldots, 10\}$, the calibration locus $M_{(1),j}$ is described by the image coordinates $\underline{m}_{(1),j}$ and is identified in FIG. 8a by the reference number (j+59).

According to the first embodiment of the method of the present invention, the location of the calibration loci of the second plurality of calibration loci 90-99 is carried out by repeating five times the steps 212 to 214. In each of these repetitions, a scene of the second plurality of scenes is constructed (step 212) a respective image of the second plurality of images 940-980 is acquired (step 213), and the calibration loci of a respective subset of the second plurality of calibration loci 90-99 is located in the respective image (step 214). The generic repetition of the steps 212 to 214 is described in terms of a counter, s, which, at step 210, is initialized to the value zero and is lower than six.

At step 212 of the $s^{th}$ repetition, the ALS 100 constructs a $s^{th}$ scene of the second plurality of scenes. In particular, at step 212 of the $s^{th}$ repetition, the DPS 160 controls the translating means 120 to translate the model panel 140 from a $(s+2)^{th}$ position with respect to the camera 150 to a $(s+3)^{th}$ position with respect to the camera 150, thereby constructing the $s^{th}$ scene of the second plurality of scenes.

At the first repetition, s=1, the $(s+2)^{th}$ position with respect to the camera 150 is the third position with respect to the camera, i.e. the position at which the model panel 140 is arranged in the second scene of the first plurality of scenes. If s>1, the $(s+2)^{th}$ position of the model panel 140 with respect to the camera 150 is in particular the position of the model panel 140 in the $(s-1)^{th}$ scene of the second plurality of scenes, this scene being constructed at step 212 of the $(s-1)^{th}$ repetition.

Figure 7A:
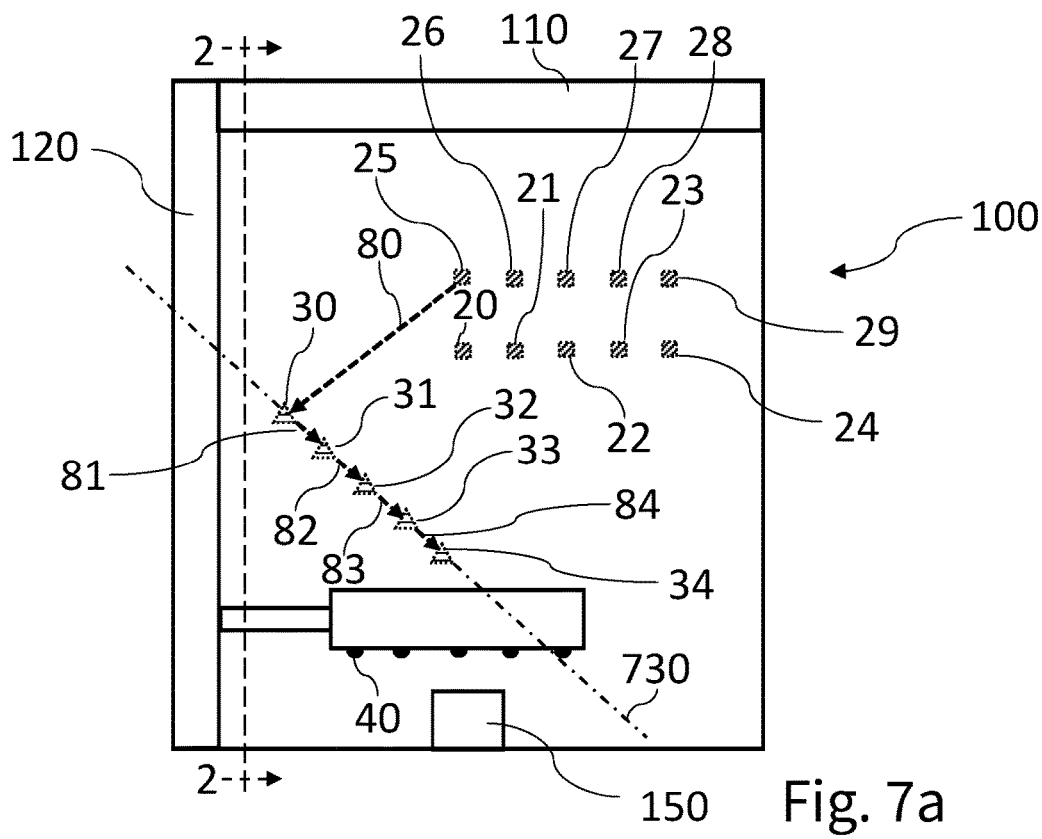
FIGS. 7a, 7b are schematic representations of the first embodiment of the ALS.
Figure 7B:
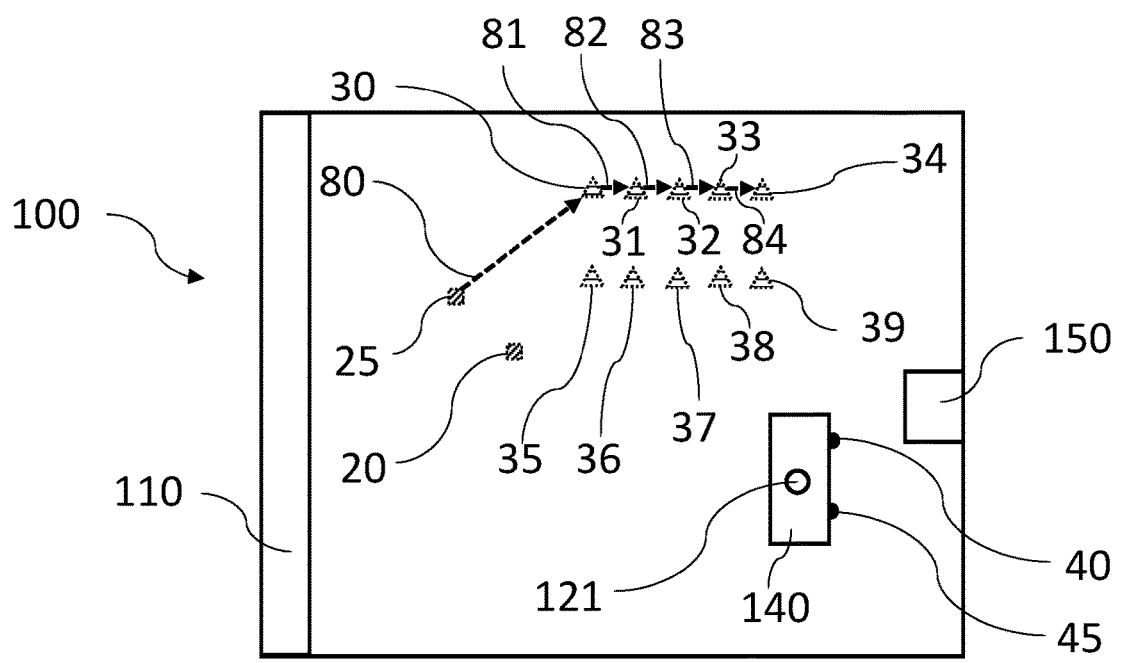

In FIGS. 7a and 7b, the locations of the second set of calibration locations 30-39 are marked by shaded triangles. In particular, FIG. 7b is a sectional view long the line 2-2 of FIG. 7a. In the $s^{th}$ scene of the second plurality of scenes, the calibration indicium 40 is arranged at the location identified in FIGS. 7a and 7b identified by the reference number (s+29). In this scene, the calibration indicium 45 is arranged at the location identified in FIGS. 7a and 7b by the reference number (s+34). As best shown in FIGS. 7a and 7b, in order to construct the $s^{th}$ scene of the second plurality of scenes, the model panel 140 is translated by a translation vector identified by the reference number (s+79).

For example, at the first repetition (s=1), the calibration indicium 40 and the calibration indicium 45 are arranged at the location 30 and at the location 35, respectively. For instance, In order to construct the first scene of the second plurality of scenes (step 212 of the first repetition), the model panel 140 is translated by the translation vector 80 in such a way that, when the model panel 140 is translated from the third position to the fourth position, the calibration indicium 40 moves from the location 25 to the location 30 (cf. FIGS. 7a, 7b). The translation vectors 81-84 have the same length, which in particular, is equal to the distance between the indicium 40 and the indicium 41.

As best shown in FIGS. 7a, the locations of the second set of calibration locations 30-39 are arranged on the second planar region 730. The first planar region 720 and the second planar region 730 form an angle with one another, the latter planar region 730 being mappable onto the former planar region 720 by means of a roto-translation.

The locations of the second set of calibration locations 30-39 are comprised in and, in particular, define, the second calibration view. In particular, in this embodiment, the second calibration view comprises ten locations $P_{(2),1}$, $P_{(2),2}, \ldots, P_{(2),10}$. For each $j \in \{1, 2, \ldots, 10\}$, the location $P_{(2),j}$ is identified in FIG. 7b by the reference number (j+29).

Figure 8B:
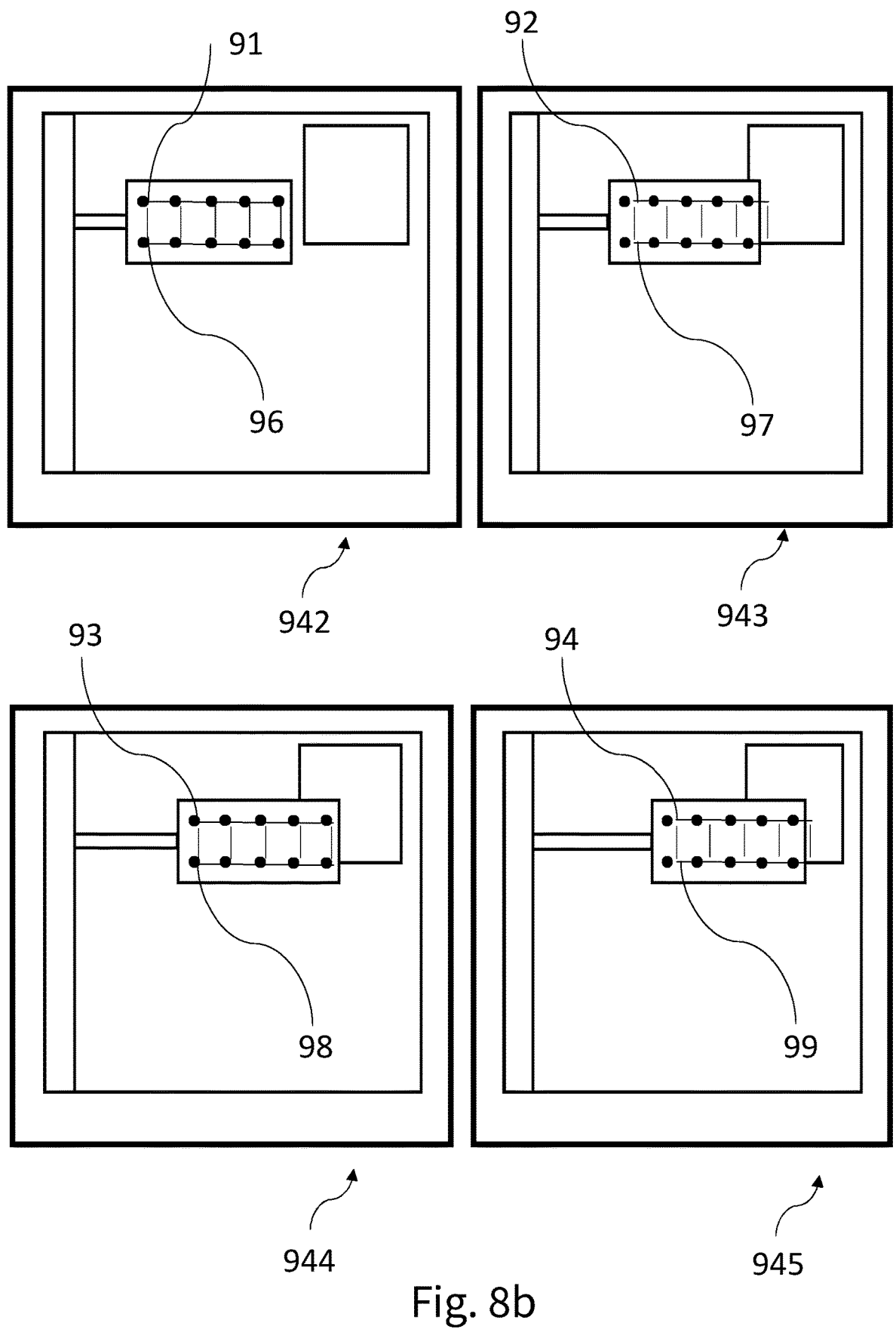

At step 213 of the $s^{th}$ repetition, the DPS 160 operates the camera 150 to acquire a $s^{th}$ image of the second plurality of images 941-945. The first image 941 of the second plurality of images is schematically depicted in FIG. 8a. In FIG. 8b, the $s^{th}$ image (s>1) of the second plurality of images is identified by the reference number (s+940).

At step 214 of the $s^{th}$ repetition, the ALS 100 locates the calibration loci of a $s^{th}$ subset of the second plurality of calibration loci 90-99 in the $s^{th}$ image of the second plurality of images 941-945. These calibration loci may be located in the $s^{th}$ image of the second plurality of images 941-945 by using the image recognition algorithm.

The $s^{th}$ subset of the second plurality of calibration loci 90-99 consists of the calibration locus identified in FIGS. 8a or 8b by the reference number (s+89) and of the calibration locus identified in FIGS. 8a or 8b by the reference number (s+94). For example, the first subset of the second plurality of calibration loci 90-99 consists of the calibration loci 90 and 95 of the first image 941 of the second plurality of images 941-945, cf. FIG. 8a.

In particular, the location identified in FIG. 7b by the reference number (s+29) is associated with the calibration locus identified in FIGS. 8a or 8b by the reference number (s+89). The location identified in FIG. 7b by the reference number (s+34) is associated with the calibration locus identified in FIGS. 8a or 8b by the reference number (s+94). For example, the locations 30 and 35 are associated with the calibration loci 90 and 95, respectively (see FIGS. 7b and 8a).

In this embodiment, the second plurality of calibration loci 90-99 consists of ten calibration loci $M_{(2),1}$, $M_{(2),2}, \ldots, M_{(2),10}$, wherein, for each $j \in \{1, 2, \ldots, 10\}$, the calibration locus $M_{(2),j}$ is described by the image coordinates $\underline{m}_{(2),j}$ and is identified in FIG. 8a or in FIG. 8b by the reference number (j+89).

The first scene, the scenes of the first plurality of scenes, and the scenes of the second plurality of scenes are constructed without the need of rotating the model panel 140.

For each $i \in \{1, 2, 3\}$, and for each $j \in \{1, 2, \ldots, 10\}$, the location $P_{(i),j}$ may be described, in the reference frame $F^{(i)}$ by the three coordinates $\vec{p}_{(i),F^{(i)},j} = (X_{(i),F^{(i)},j}\ Y_{(i),F^{(i)},j}\ Z_{(i),F^{(i)},j})^T$. For each $i \in \{1, 2, 3\}$, the reference frame F(i) is chosen in such a way that its (X, Y) plane comprises the ten locations $P_{(i),1}, P_{(i),2}, \ldots, P_{(i),10}$. In particular, for each $i \in \{1, 2, 3\}$ and for each $j \in \{1, 2, \ldots, 10\}$, Z(i)F(i),j=0.

In particular, the coordinates of the frame $F_{(1)}$ may be transformed into the coordinates of the frame $F_{(2)}$ and into to coordinates of the frame $F_{(3)}$ by respectively using a fourth and a fifth roto-translation. For each $i \in \{1, 2, 3\}$, the reference frame $F_{(i)}$ can be defined by using the same unit length, $L_{(i)}$, for each axis of the reference frame $F_{(i)}$. In particular, $L_{(1)} = L_{(2)} = L_{(3)}$.

At step 216, the DPS 160 calibrates the camera 150 by using the loci of the first plurality of calibration loci 60-69 as locations in the image plane of the projection onto the image plane of the first calibration view, the loci of the second plurality of calibration loci 90-99 as locations in the image plane of the projection onto the image plane of the second calibration view, and the loci of the fourth plurality of calibration loci 50-59 as locations in the image plane of the projection onto the image plane of the third calibration view. In particular, the calibration of the camera 150 is carried out by using, for each $j \in \{1, 2, \ldots, 10\}$ and each $i \in \{1, 2, 3\}$, the calibration locus $M_{(i),j}$ as the location in the image plane of the projection onto the image plane of the location $P_{(i),j}$.

The calibration of the camera 150 is carried by minimizing the parametric function given by:

$$G = \sum_{i=1}^{3} \sum_{j=1}^{10} \left\| q_{(i),j} - m_{(i),j} \right\|_{[2]}^{2}, \quad (15)$$

In eq. (15), for each $j \in \{1, 2, \ldots, 10\}$ and each $i \in \{1, 2, 3\}$, $q_{(i),j}$ is computed by using eqs. (5) to (9) with the replacements (1)→(i) and F→$F^{(i)}$. The rotation matrix $R_{(2)}$ and the translation vector $\vec{t}_{(2)}$ are parametrized by the parameters of a set of parameters associated with the second view. This set of paraments may comprise the three entries of the translation vector $\underline{t}_{(2)}$ and three parameters parametrizing the entries of the rotation matrix $R_{(2)}$. The set of parameters associated with the second view consists of A elements that may be collected in the six-dimensional list $\hat{a}_{(2)}$. The rotation matrix $R_{(3)}$ and the translation vector $\underline{t}_{(3)}$ are parametrized by the parameters of a set of parameters associated with the third view. This set of paraments may comprise the three entries of the translation vector $\underline{t}_{(3)}$ and three parameters parametrizing the entries of the rotation matrix $R_{(3)}$. In particular, the set of parameters associated with the third view consists of A elements that may be collected in the six-dimensional list $\hat{a}_{(3)}$.

The parametric function G is minimized for the parameters comprised in the lists $\hat{c}$, $\hat{a}_{(1)}$, $\hat{a}_{(2)}$, and $\hat{a}_{(3)}$. If the lens distortion is not negligible, the function G depends on the parameters comprised in the list $\hat{k}$ via the coefficient D(X', Y',Z'), cf. eq. (7a). In this case, the function G is minimized also for the parameters comprised in the list $\hat{k}$. The minimization of the function G may be carried out by using iterative methods such as the Levenberg-Marquart method. Alternatively, with the above, in eq. (15), for each $j \in \{1, 2, \ldots, 10\}$ and each $i \in \{1, 2, 3\}$, $q_{(i),j}$ may be computed by using eqs. (6) to (9), (11) and (12) with the replacement (1)→(i) and F→$F_{(i)}$. In this case, in particular, the parametric function G may be minimized for the parameters comprised in the lists $\hat{\ell}$, $\hat{a}_{(1)}$, $\hat{a}_{(2)}$, and $\hat{a}_{(3)}$, the list $\hat{\ell}$ being given by:

$$\hat{\ell} = (\overline{k}_1 \overline{k}_2 \overline{k}_3 \overline{k}_4 \overline{k}_5 \overline{k}_6 \overline{k}_7 \overline{k}_8 f_x f_y u_c v_c).$$

In the first embodiment of the method of the present invention, the step of constructing the scenes of the first plurality of scene is carried out in two sub-steps (step 204 and 207). Moreover, also the step acquiring of the images of the first plurality of images is carried out in two sub-steps (steps 205 and 208). The step of locating the calibration loci of the first plurality of calibration loci is carried out in two sub-steps, steps 206 and 209, as well.

According to this embodiment, the step of locating the calibration loci of the first plurality of calibration loci is started before completion of the step of acquiring the images of the first plurality of images and before completion of the step of constructing the scenes of the first plurality of scenes, as steps 207 and 208 are carried out after step 206.

Further embodiments of the method according to the present invention may comprise the steps 201 to 216 of the first embodiment described above. The former embodiments may differ from one another and from the first embodiment in the order, according to which the steps 201 to 216 are carried out. For example, according to an embodiment of the invention, step 207 may be carried out after step 204 and before step 205. In conjunction with the above, step 208 may be carried out after step 205 and before step 206. For example, in an embodiment of the method, step 206 is carried out after step 208 and before step 209.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of present invention or with respect to a particular figure are, wherever applicable, also advantages of other embodiments of the present invention.

LIST OF REFERENCE SIGNS 1-1, 2-2 Sectional line
10, . . . , 19 Calibration locations in fourth set
20, . . . , 29 Calibration locations in first set
30, . . . , 39 Calibration locations in second set
40, . . . , 49 Calibration indicia of fourth set
50, . . . , 59 Calibration loci of the fourth plurality
60, . . . , 69 Calibration loci of the first plurality
70, 71, Translation vector
80, . . . , 89
90, . . . , 99 Calibration loci in second plurality
100 Automated laboratory system (ALS)
110 Work deck
111 Waste container
120 Translating means
121 Extensible arm, e.g., telescopic arm
140 Model panel
141 Face of the model panel
150 Digital camera/Optical recording device
160 Data processing system (DPS)
161 I/O interface
162 Network interface controlloer (NIC)
170 Processing means
171 Construction module
172 Acquisition module
173 Location module
174 Calibration module
180 Storage means
181 Volative primary memory
182 Non-volatile primary memory
183 Secondary memory
240 Extension direction
310 First direction
320 Second direction
330 Third direction
710 Fourth planer region
720 First planar region
730 Second planar region
760 Angle
910, 920, Images within first plurality
930
941, . . . , 945 Images within second plurality

The invention claimed is:

1. A computer implemented method for calibrating an optical recording device, the optical recording device being associated with a field of view and an image plane, by using at least a model panel, the model panel comprising a set of calibration indicia, and a first calibration view, wherein the first calibration view comprises a first set of calibration locations of the field of view,
wherein the method comprises at least the steps of:
constructing at least a plurality of scenes so that, for each location of the first set of calibration locations, a calibration indicium of the set of indicia is located in a respective scene of the plurality of scenes at said each location, and wherein each scene of the plurality of scenes is constructed by translating the model panel to a respective position with respect to the optical recording device;
acquiring at least a plurality of images, so that each scene of the plurality of scenes is displayed in a respective image of the plurality of images;
locating at least a plurality of calibration loci so that, for each location of the first set of calibration locations, a respective locus of the plurality of calibration loci is comprised in a respective image of the plurality of images, said respective image displaying a respective calibration indicium and said respective calibration indicium being located at said each location and being displayed in said respective locus;
calibrating the optical recording device by using at least the loci of the plurality of calibration loci as locations in the image plane of the projection onto the image plane of the first calibration view, wherein the optical recording device is calibrated by using a second calibration view, the second calibration view comprising a second set of calibration locations of the field of view, wherein each location of the second set of calibration locations is mappable to a respective location of the first set of calibration locations by using a first roto-translation; and
mapping each location of the second set of calibration locations onto a respective location of the field of view by using the first roto-translation, thereby constructing the first set of calibration locations.

2. The method according to claim 1, wherein the locations of the first set of calibration locations are arranged on a first planar region of the field of view and the locations of the second set of calibration locations are arranged on a second planar region of the field of view, wherein the first planar region and the second planar region form an angle with one another.

3. The method according to claim 2, wherein the first planar region and the second planar region are substantially perpendicular to one another.

4. The method according to claim 1, wherein the locations of the first set of calibration locations and the locations of the second set of locations are arranged on a third planar region of the field of view.

5. The method according to claim 1, wherein the locations of the first set of calibration locations are arranged with respect to one another so that each location of the first set of calibration locations is located at a respective node of a grid graph.

6. The method according to claim 5, wherein the grid graph is a rectangle and/or square grid graph.

7. The method according claim 1, wherein the first set of calibration locations comprises at least a first location and a second location, the first location and the second location being aligned on a first line at a first distance with respect to one another, and the set of calibration indicia comprises at least a first indicium and a second indicium, the first indicium and the second indicium being aligned on a second line at a second distance with respect to one another,
wherein the first distance and the second distance are substantially equal to one another and the first line and the second line are substantially parallel to one another,
and wherein the step of constructing the plurality of scenes comprises constructing a first scene by translating the model panel to a first position with respect to the optical recording device so that, in the first position, the first indicium and the second indicium are located at the first location and at the second location, respectively.

8. The method according to claim 7, wherein the first set of calibration locations comprises at least a third location and a fourth location,
wherein the third location and the fourth location are aligned on a third line, the third line being substantially parallel to the first line, wherein the first location and the third location are aligned on a fourth line, and the second location and the fourth location are aligned on a fifth line, the fourth line and the fifth line being substantially parallel to one another,
wherein the step of constructing the plurality of scenes comprises constructing a second scene by translating the model panel from the first position to a second position with respect to the optical recording device so that, in the second position, the first indicium and the second indicium are located at the third location and at the fourth location, respectively.

9. The method according to claim 1, wherein the set of calibration indicia consists of a third indicium.

10. The method according to claim 9, wherein the third indicium is a dot or a polygon.

11. The method according to claim 10, wherein the third indicium is a square.

12. The method according to claim 1, wherein the model panel comprises a plurality of squares forming a square grid or a chessboard pattern, the square grid or chessboard patter comprising a set of vertices of the plurality of squares, wherein each calibration indicium of the set of calibration indicia is or is located at a respective vertex of the set of vertices.

13. The method according to claim 1, wherein the step of locating the plurality of calibration loci comprises locating at least a locus of the plurality of calibration loci by using an image recognition algorithm.

14. The method according to claim 1, wherein the step of calibrating the optical recording device is carried out by using a set of parameters, wherein the set of parameters comprises parameters that parametrize a second roto-translation and/or a homography transformation.

15. The method according to claim 14, wherein the step of calibrating the optical recording device comprises minimizing a parametric function with respect to the parameters of the set of parameters, wherein the parametric function depends on the parameters of the set of parameters.

16. A data processing system comprising an optical recording device associated with a field of view and an image plane, a translating assembly comprising at least one rail and at least one motor for translating a model panel in the field of view, and a processor configured to perform the method according to claim 1.

17. The data processing system according to claim 16, wherein the at least one rail comprises a first rail and a second rail, the at least one motor being operatively connected to the second rail.

18. The data processing system according to claim 16, further comprising a telescopic arm movably connected to one of the at least one rail such that the telescopic arm is translatable along the one of the at least one rail.

19. An automated laboratory system comprising an optical recording device associated with a field of view and an image plane, a translating assembly comprising at least one rail and at least one motor for translating a model panel in the field of view, a processor configured to perform the method according to claim 1, and a work deck for positioning a labware item.

* * * * *